US008699563B2

(12) United States Patent
Takahashi et al.

(10) Patent No.: US 8,699,563 B2
(45) Date of Patent: Apr. 15, 2014

(54) IMAGE CODING APPARATUS AND IMAGE CODING METHOD

(75) Inventors: Kashu Takahashi, Tokyo (JP); Takaaki Fuchie, Kanagawa (JP); Shojiro Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 610 days.

(21) Appl. No.: 12/757,358

(22) Filed: Apr. 9, 2010

(65) Prior Publication Data

US 2010/0266047 A1 Oct. 21, 2010

(30) Foreign Application Priority Data

Apr. 16, 2009 (JP) ................ P2009-099901

(51) Int. Cl.
G06K 9/00 (2006.01)
H04B 1/66 (2006.01)

(52) U.S. Cl.
USPC .......................................... 375/240; 382/251

(58) Field of Classification Search
None
See application file for complete search history.

(56) References Cited

U.S. PATENT DOCUMENTS

| 5,703,646 | A | * | 12/1997 | Oda | 375/240.13 |
| 6,084,914 | A | * | 7/2000 | Katata et al. | 375/240 |
| 6,141,381 | A | * | 10/2000 | Sugiyama | 375/240.16 |
| RE40,679 | E | | 3/2009 | Oda | |
| 7,965,896 | B2 | * | 6/2011 | Tanizawa et al. | 382/232 |
| 8,170,359 | B2 | * | 5/2012 | Tanaka | 382/251 |
| 8,238,423 | B2 | * | 8/2012 | Shibata et al. | 375/240.03 |
| 8,270,744 | B2 | * | 9/2012 | Fuchie et al. | 382/251 |
| 8,270,745 | B2 | * | 9/2012 | Fuchie et al. | 382/251 |
| 2006/0013299 | A1 | * | 1/2006 | Sato et al. | 375/240.03 |
| 2008/0285866 | A1 | * | 11/2008 | Ishikawa | 382/232 |
| 2008/0310510 | A1 | * | 12/2008 | Hiwasa et al. | 375/240.16 |
| 2009/0046780 | A1 | * | 2/2009 | Murakami et al. | 375/240.03 |
| 2009/0067738 | A1 | * | 3/2009 | Fuchie et al. | 382/251 |
| 2009/0161758 | A1 | * | 6/2009 | Shimazu et al. | 375/240.03 |
| 2009/0185749 | A1 | * | 7/2009 | Fukuhara et al. | 382/233 |

FOREIGN PATENT DOCUMENTS

JP 3358620 10/2002

OTHER PUBLICATIONS

Viscito et al, "A Video Compression Algorithm with Adaptive Bit Allocation and Quantization", Visual Communication and Image Processing '91: Visual Communication. Boston, Nov. 11-13, 1991; Proceedings of SPIE, vol. 1605 Part 01/02, Nov. 11, 1991, pp. 58-72.*

(Continued)

Primary Examiner — Jay Patel
Assistant Examiner — Reza Aghevli
(74) Attorney, Agent, or Firm — Frommer Lawrence & Haug LLP; William S. Frommer; Ellen Marcie Emas

(57) ABSTRACT

An image coding apparatus includes a first coding unit that discretely selects quantization parameters of a first range to perform calculation of generated code amounts corresponding to the selected quantization parameters, a second coding unit that performs calculation of generated code amounts corresponding to quantization parameters of a second range, a code amount control unit that decides deciding a temporary quantization parameter corresponding to a target code amount by calculating generated code amounts through an interpolation process for quantization parameters not selected by the first coding unit, and by comparing the generated code amounts corresponding to the selected quantization parameters and the generated code amounts calculated through the interpolation process with the target code amount, and decides an optimal quantization parameter corresponding to the target code amount by comparing the generated code amounts calculated by the second coding unit with the target code amount.

10 Claims, 15 Drawing Sheets

(56) References Cited

OTHER PUBLICATIONS

Viscito et al, "A Video Compression Algorithm with Adaptive Bit Allocation and Quantization", Visual Communication and Image Precessing '91: Visusl Communication. Boston, Nov. 11-13, 1991; Proceedings of SPIE, vol. 1605 Part 01/02, Nov. 11, 1991, pp. 58-72.*

* cited by examiner

IMAGE CODING APPARATUS AND IMAGE CODING METHOD

BACKGROUND OF THE INVENTION

1. Technical Field

The present invention relates to an image coding apparatus and an image coding method. Particularly, the present invention relates to a technology of allowing generated code amounts to correspond to a target code amount given to one picture without performing in-screen feedback control.

2. Description of the Related Art

According to the related art, in a system which transmits a bit stream of a moving image or records the bit stream on recording media, high efficiency coding is performed in order to efficiently use a transmission path or a recording capacity.

In an image coding apparatus for realizing the high efficiency coding, a quantization step is controlled such that a coding bit rate of a bit stream generated in an encoder becomes constant in accordance with a transmission rate of a transmission medium. For example, the image coding apparatus suppresses generated data amounts by increasing a quantization step when an image with a complicated pattern is continuous, and increases the generated data amounts by reducing the quantization step when a simple pattern is continuous. The image coding apparatus prevents overflow or underflow from occurring by controlling the quantization step as described above, thereby ensuring a fixed rate.

Thus, in the image coding apparatus according to the related art as described above, when a complicated image is continuous, the quantization step is increased, so that image quality is degraded. When a simple image is continuous, the quantization step is reduced, so that uniform image quality may not be obtained throughout the image.

In this regard, for example, according to Japanese Patent Registration No. 3358620, an assigned code amount assigned to each GOP (Group Of Pictures) is adjusted according to the ratio of the sum of the difficulty of coding for each GOP and the difficulty of coding regarding a plurality of GOPs. For example, a large code amount is assigned to a GOP including an image with a complicated pattern, and a small code amount is assigned to a GOP including an image with a simple pattern.

Meanwhile, as a method of allowing generated code amounts to correspond to a target code amount given to one picture, for example, there is a method called step 2 of a TM5 (test model 5). This denotes a scheme in which a target code amount is set by uniformly distributing a code amount assigned to a picture to macro blocks (MBs) and feedback control is performed in the picture, so that generated code amounts are allowed to correspond to the target code amount.

SUMMARY OF THE INVENTION

In the case of using a method of allowing generated code amounts to correspond to a target code amount given to one picture, if the generated code amounts are calculated with all quantization parameters, an optimal quantization parameter can be easily decided. However, if the generated code amounts are calculated with all quantization parameters, the circuit size or the amount of processing may be increased, so that coding may not be easily performed with a low-cost configuration.

Further, if calculation of generated code amounts is performed by discretely selecting quantization parameters, the circuit size can be reduced. In such a case, generated code amounts of unselected quantization parameters are calculated through an interpolation process. However, if the prediction accuracy of the generated code amounts calculated through the interpolation is not high, an optimal quantization parameter of a picture with respect to a target code amount may not be set with high accuracy.

In view of the above issues, it is desirable to provide an image coding apparatus and an image coding method, which can allow generated code amounts to easily correspond to a target code amount given to one picture without performing in-screen feedback control.

According to one embodiment of the invention, there is provided an image coding apparatus including: a first coding unit that discretely selects quantization parameters of a first range to perform calculation of generated code amounts corresponding to the selected quantization parameters; a second coding unit that performs calculation of generated code amounts corresponding to quantization parameters of a second range which is narrower than the first range and is based on a temporary quantization parameter; and a code amount control unit that decides the temporary quantization parameter corresponding to a target code amount by calculating generated code amounts corresponding to quantization parameters not selected by the first coding unit through an interpolation process, and comparing the generated code amounts corresponding to the selected quantization parameters and the generated code amounts calculated through the interpolation process with the target code amount, and decides an optimal quantization parameter corresponding to the target code amount by comparing the generated code amounts calculated by the second coding unit with the target code amount. The code amount control unit changes an interpolation method according to values of quantization parameters used for calculating the generated code amounts through the interpolation process.

According to the invention, the first coding unit discretely selects the quantization parameters of the first range to perform the calculation of the generated code amounts corresponding to the selected quantization parameters. The code amount control unit calculates the generated code amounts corresponding to the quantization parameters not selected by the first coding unit through the interpolation process, and decides the temporary quantization parameter corresponding to the target code amount by comparing the generated code amounts corresponding to the selected quantization parameters and the generated code amounts calculated through the interpolation process with the target code amount.

According to the interpolation process, the generated code amounts corresponding to the selected quantization parameters are compared with the target code amount, so the quantization parameters used for calculating the generated code amounts through the interpolation process are determined. In addition, the interpolation method is changed according to the positions of the determined quantization parameters. For example, after the interpolation method is changed according to whether the quantization parameters used for calculating the generated code amounts through the interpolation process have values in an area between the quantization parameters selected by the first coding unit, when the quantization parameters used for calculating the generated code amounts through the interpolation process have the values in the area between the selected quantization parameters, interpolation using a quadratic curve is performed. According to the interpolation using the quadratic curve, in the case in which the temporary quantization parameter corresponding to the target code amount exists in an area of quantization parameters, which are limited to a preset range when an offset corresponding to activity has been added, the quantization parameters are converted into average quantization parameters and generated code amounts corresponding to the average quantization parameters are calculated through interpolation.

Further, when the quantization parameters used for calculating the generated code amounts through the interpolation process do not have the values in the area between the selected quantization parameters, interpolation using variation is performed. According to the interpolation using the variation, the variation is calculated from the generated code amounts of the selected quantization parameters, and the interpolation is performed using the calculated variation in an interval of the quantization parameters used for calculating the variation. Further, when the interval of the quantization parameters used for calculating the variation is greater than 1, generated code amounts of quantization parameters located in an area of the quantization parameters used for calculating the variation are obtained through linear interpolation based on the generated code amounts obtained through the interpolation process in the interval of the quantization parameters used for calculating the variation.

The second coding unit performs calculation of generated code amounts corresponding to the quantization parameters of the second range which is narrower than the first range and is based on the temporary quantization parameter. The code amount control unit decides the optimal quantization parameter corresponding to the target code amount by comparing the generated code amounts corresponding to the quantization parameters of the second range with the target code amount. The coding for an image is performed using the optimal quantization parameter in the third coding unit.

According to another embodiment of the invention, there is provided an image coding method including the steps of: discretely selecting by a first coding unit quantization parameters of a first range to perform calculation of generated code amounts corresponding to the selected quantization parameters; calculating by a code amount control unit generated code amounts through an interpolation process for quantization parameters not selected by the first coding unit, and deciding a temporary quantization parameter corresponding to a target code amount by comparing the generated code amounts corresponding to the selected quantization parameters and the generated code amounts calculated through the interpolation process with the target code amount; performing by a second coding unit calculation of generated code amounts corresponding to quantization parameters of a second range which is narrower than the first range and is based on the temporary quantization parameter; and deciding by the code amount control unit an optimal quantization parameter corresponding to the target code amount by comparing the generated code amounts calculated by the second coding unit with the target code amount. In the interpolation process performed by the code amount control unit, an interpolation method is changed according to values of quantization parameters used for calculating generated code amounts through the interpolation process.

According to the invention, the quantization parameters of the first range are discretely selected and the generated code amounts corresponding to the selected quantization parameters are calculated. Further, after the generated code amounts corresponding to the unselected quantization parameters are calculated through the interpolation process, the temporary quantization parameter corresponding to the target code amount is decided by comparing the generated code amounts corresponding to the selected quantization parameters and the generated code amounts calculated through the interpolation with the target code amount. According to the interpolation process, the interpolation method is changed according to the values of the quantization parameters used for calculating the generated code amounts through the interpolation process. In addition, the calculation of the generated code amounts corresponding to the quantization parameters of the second range, which is narrower than the first range and is based on the temporary quantization parameter, is performed, and the optimal quantization parameter corresponding to the target code amount is decided from the comparison of the generated code amounts corresponding to the quantization parameters of the second range and the target code amount. The coding for an image is performed using the optimal quantization parameter.

As described above, it is possible to provide the image coding apparatus and the image coding method, capable of improving the prediction accuracy of the generated code amounts calculated through the interpolation by changing the interpolation method according to the values of the quantization parameters used for calculating the generated code amounts through the interpolation process, and allowing the generated code amounts to easily correspond to the target code amount given to one picture without performing in-screen feedback control.

DESCRIPTION OF THE PREFERRED EMBODIMENTS

Hereinafter, an image coding apparatus and an image coding method according to an embodiment of the invention will be described. According to the image coding apparatus and the image coding method, when performing code amount control through an image compression scheme using representative arithmetic coding in MPEG 4 AVC (Advanced Video Coding) and the like, first pre-encoding and second pre-encoding are performed. In the first pre-encoding, parallel pre-encoding is performed, and base quantization parameters (QP) for realizing a target code amount from quantization parameters of a wide range is roughly estimated. Further, in the second pre-encoding, parallel pre-encoding is performed in a narrow range based on the estimation result of the first pre-encoding, and an optical base quantization parameter used for main coding is decided. In addition, when the base quantization parameters for realizing the target code amount are roughly estimated in the first pre-encoding, generated code amounts of unselected quantization parameters are calculated through an interpolation process. Moreover, an interpolation method is changed according to the positions of the quantization parameters used for calculating the generated code amount.

As described above, according to the image coding apparatus and the image coding method, uniform code amount distribution in a picture can be realized by reducing processing load while improving the accuracy of image coding. Further, according to the image coding apparatus and the image coding method, the accuracy when the base quantization parameters are roughly estimated in the first pre-encoding is improved, so that appropriate base quantization parameters can be easily decided. Hereinafter, the description will be given in order of the following items.

1. Configuration of Image Coding Apparatus
2. Coding Procedure
3. Q matrix Switching Process
4. Temporary Quantization Parameter Decision Process
5. Interpolation Process
6. Interpolation using Quadratic Curve
7. Interpolation using Variation
8. Optimal Quantization Parameter Decision Process <1. Configuration of the Image Coding Apparatus>

Figure 1:
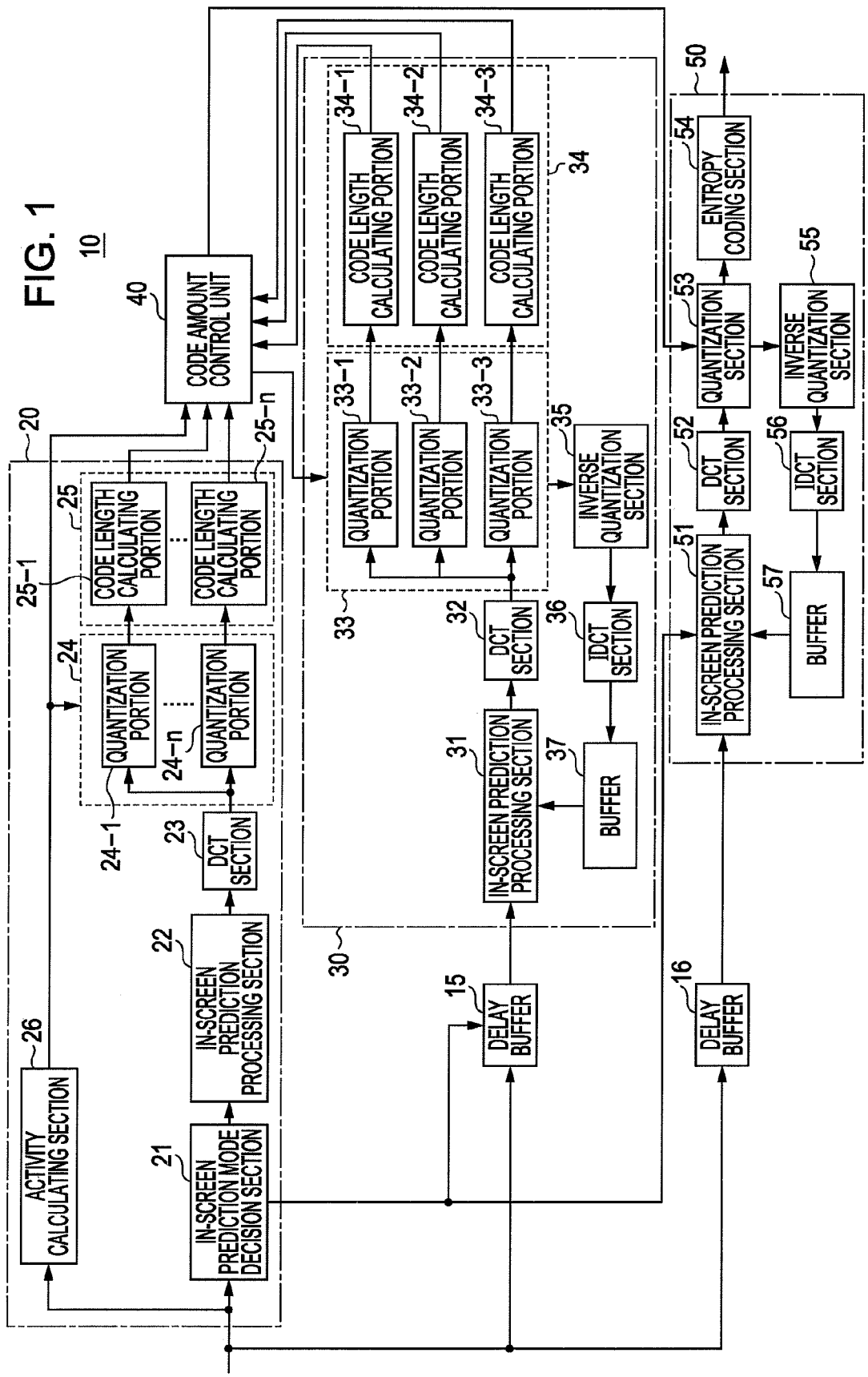
FIG. 1 is a block diagram illustrating the configuration of an image coding apparatus.

FIG. 1 is the configuration of the image coding apparatus. The image coding apparatus 10 includes a first pre-encoding unit 20 and a second pre-encoding unit 30, which perform parallel pre-encoding, a code amount control unit 40, an encoding unit 50 that performs main encoding, and delay buffers 15 and 16.

The first pre-encoding unit 20 serving as a first coding unit is a module that performs first pre-encoding. The first pre-encoding unit 20 includes an in-screen prediction mode decision section 21, an in-screen prediction processing section 22 and a DCT (Discrete Cosine Transform) section 23. Further, the first pre-encoding unit 20 includes a quantization section 24, a code length calculating section 25 and an activity calculating section 26. In addition, the quantization section 24 includes a plurality of quantization portions 24-1 to 24-n and the code length calculating section 25 includes a plurality of code length calculating portions 25-1 to 25-n.

The second pre-encoding unit 30 serving as a second coding unit is a module that performs second pre-encoding. The second pre-encoding unit 30 includes an in-screen prediction processing section 31, a DCT section 32, a quantization section 33, a code length calculating section 34, an inverse quantization section 35, an IDCT (Inverse DCT) section 36 and a buffer 37. Further, the quantization section 33, for example, includes a plurality of quantization portions 33-1 to 33-3 and the code length calculating section 34, for example, includes a plurality of code length calculating portions 34-1 to 34-3.

The code amount control unit 40 is a module that performs code amount control.

The encoding unit 50 serving as a third coding unit is a module that performs main coding. The encoding unit 50 includes an in-screen prediction processing section 51, a DCT section 52, a quantization section 53, an entropy coding section 54, an inverse quantization section 55, an IDCT section 56 and a buffer 57.

With such a configuration, an image signal of an input image is supplied to the first pre-encoding unit 20 and the delay buffers 15 and 16.

The image signal input to the first pre-encoding unit 20 is input to the in-screen prediction mode decision section 21 and the activity calculating section 26. The in-screen prediction mode decision section 21 decides an in-screen prediction mode based on the image signal. In general, a prediction mode (prediction direction) is decided from 9 types of prediction modes in (4×4) pixel units.

The decided in-screen prediction mode is sent to the second pre-encoding unit 30 and the encoding unit 50, and is used for the second pre-encoding in the second pre-encoding unit 30 and the main encoding in the encoding unit 50.

The in-screen prediction processing section 22 generates an image signal of a difference image representing the difference between a prediction image and the input image. Herein, the prediction image is created from the input image for reducing processing. If the in-screen prediction processing is performed using the image signal of the input image as described above, an inverse quantization section, an IDCT section and a buffer can be eliminated and the circuit size can be reduced.

The DCT section 23 sends DCT coefficients, which are obtained through integer precision DCT, to the quantization portions 24-1 to 24-n. The quantization section 24 performs quantization with respect to the DCT coefficient and sends the quantization result to the code length calculating section 25. The code length calculating section 25 calculates code amounts by performing CAVLC (Context-Adaptive Variable Length Coding). According to the CAVLC, high efficient coding can be adaptively selected according to the peripheral circumstances.

In the first pre-encoding as described above, even if CABAC (Context-Adaptive Binary Arithmetic Coding) is used as entropy coding, the CAVLC is used for calculating the code amounts. Further, the CABAC denotes context-adaptive binary arithmetic coding.

The quantization section 24 includes the quantization portions 24-1 to 24-n (n=1, 2, 3 . . . ) provided in parallel to each other, and the code length calculating section 25 includes the code length calculating portions 25-1 to 25-n (n=1, 2, 3 . . . ) provided in parallel to each other.

In the first pre-encoding, quantization parameters are discretely selected from quantization parameters of a first range by the parallel number of the quantization section 24 and the code length calculating section 25. Further, in the first pre-encoding, quantization and code length calculation are performed with respect to the selected quantization parameters in a parallel manner, and respective generated code amounts are output from the first pre-encoding unit 20 to the code amount control unit 40.

That is, the first pre-encoding unit 20 performs the first pre-encoding with the quantization parameters QP of the first range based on parallel pre-encoding portions which suppress the circuit size by the quantization section 24 and the code length calculating section 25. Further, the code amount control unit 40 can roughly estimate the base quantization parameters for realizing the target code amount by using the generated code amount calculated by the first pre-encoding unit 20. Furthermore, in the following description, the roughly estimated base quantization parameters will be referred to as a temporary quantization parameter QP_precode1.

The quantization parameters QP denote values for designating quantization values in AVC. If the quantization parameters QP become large, the quantization values become also large.

Simultaneous to the decision of the in-screen prediction mode by the in-screen prediction mode decision section 21, the activity calculating section 26 calculates activity to group macro blocks according to the activity. An activity group number decided for each macro block is input to the quantization section 24.

The activity represents properties of a local image in a screen. As the activity of the macro block, as well known in the related art, for example, the sum of absolute values for errors of each image signal with respect to an average value of image signals in macro blocks, or distribution of each image signal in the macro blocks is used.

The code amount control unit 40 obtains a temporary quantization parameter and a quantization matrix Q matrix, which are used for the next step, from the result of the first pre-encoding performed by the first pre-encoding unit 20.

That is, in the first pre-encoding, the quantization parameters QP of the acquisition range (first range) are discretely selected, and the parallel pre-encoding is performed with the selected quantization parameters QP to obtain the generated code amounts. The code amount control unit 40 calculates generated code amounts of sorted quantization parameters QP through the interpolation process by using the obtained generated code amounts. The code amount control unit 40 performs the interpolation process by changing an interpolation method according to the positions of quantization parameters for calculating the generated code amounts. In addition, the code amount control unit 40 decides the temporary quantization parameter QP_precode1 by comparing the obtained generated code amounts and the generated code amount calculated through the interpolation process with the target code amount.

The code amount control unit 40 obtains information (Q matrix, QP of each macro block and the like) of quantization from the temporary quantization parameter QP_precode1, the Q matrix and the activity groups of each macro block, and supplies them to the second pre-encoding unit 30. The second pre-encoding unit 30 performs the second pre-encoding based on these values.

That is, in relation to the second pre-encoding unit 30, the image signal of the input image is delayed through the delay buffer 15 and then is input to the in-screen prediction processing section 31. The in-screen prediction processing section 31 generates an image signal of a difference image representing the difference between a prediction image and the input image. Then, the DCT section 32 performs a DCT, the quantization section 33 performs quantization of DCT coefficients, and the code length calculating section 34 calculates generated code amounts.

Further, in the above process, the output of the quantization section 33 is sent to the inverse quantization section 35. The inverse quantization section 35 reproduces the DCT coefficients through inverse quantization. Then, the IDCT section 36 performs IDCT conversion with respect to the DCT coefficients, reproduces an input image and allows the input image to be stored in the buffer 37.

In this example, the quantization section 33 includes three-stages of the quantization portions 33-1 to 33-3, and the code length calculating section 34 includes three-stages of the code length calculating portions 34-1 to 34-3. The reason for employing the three-stage configuration is because the quantization parameters QP have already been roughly estimated through the first pre-encoding in a wide range.

The quantization section 33 and the code length calculating section 34 calculate generated code amounts with quantization parameters QP of a second range based on the temporary quantization parameter QP_precode1. For example, when the quantization section 33 and the code length calculating section 34 employ the three-stage configuration, a range including quantization parameters of "QP_precode1+1" and "QP_precode1−1" about the temporary quantization parameter QP_precode1 is defined as the second range. At this time, the code length calculating section 34 selects a coding scheme, which is equal to an entropy coding scheme of the main encoding performed by the encoding unit 50, from any one of the CABAC and the CAVLC.

The code amount control unit 40 decides base quantization parameters used for the main encoding from the generated code amounts obtained through the second pre-encoding. Further, the code amount control unit 40 sends the information (the Q matrix, the QP of each macro block and the like) of the quantization to the encoding unit 50 based on the decided base quantization parameters, the Q matrix and the activity groups of each macro block.

The encoding unit 50 performs the main encoding by using the base quantization parameters, the Q matrix, the activity groups and the like. That is, if the image signal of the input image delayed through the delay buffer 16 is received, the in-screen prediction processing section 51 generates an image signal of a difference image, which represents the difference between a prediction image and the input image, in the prediction mode decided in the first pre-encoding. The DCT section 52 performs a DCT and the quantization section 53 performs quantization of DCT coefficients. The output of the quantization section 53 is sent to the inverse quantization section 55.

The inverse quantization section 55 reproduces the DCT coefficients through inverse quantization. Then, the IDCT section 56 performs IDCT conversion with respect to the DCT coefficients, reproduces an input image and allows the input image to be stored in the buffer 57.

In this way, after the DCT is performed by the DCT section 52 and the quantization of the DCT coefficients is performed by the quantization section 53, the entropy coding is performed by the entropy coding section 54 and an output stream regarded as the target code amount is output.

As described above, in the first pre-encoding performed by the first pre-encoding unit 20, the image coding apparatus 10 calculates the generated code amounts when performing the encoding with the discretely selected quantization parameters. Further, the image coding apparatus 10 decides the temporary quantization parameter QP_precode1 which is obtained by roughly estimating the base quantization parameters corresponding to a generated code amount set to a target.

At this time, the first pre-encoding unit 20 performs parallel encoding to calculate the generated code amounts when performing the encoding with the discretely selected quantization parameters.

In general, in order to perform the parallel encoding, the circuit size is significantly increased. However, in the first pre-encoding unit 20, only the quantization section 24 and the code length calculating section 25 have the parallel configuration and other elements are used in common. With such a configuration, the first pre-encoding unit 20 performs the calculation of the generated code amounts with respect to the quantization parameters QP after being sorted. Consequently, the circuit size can be reduced and the parallel encoding can be performed. Further, since the first pre-encoding unit 20 is configured to perform the in-screen prediction process by using the input image, an inverse quantization section, an IDCT section and a buffer are not used. Thus, the circuit size can be further reduced and the parallel encoding can be performed.

Meanwhile, in the case of using the CABAC for entropy coding, a case may occur in which a process may not be performed at a high bit rate. That is, when performing code amount calculation with certain quantization parameters QP in order to predict code amounts, if generated amounts with the quantization parameters QP are large, the code amounts may not be predicted.

The CABAC is an entropy coding scheme that compresses data by performing probability calculation every one bit. Processing by one bit represents that a processing time is increased if the code amounts are increased, and a process may not be completed in a constant time (e.g., a time of one frame). Thus, when the code amounts are increased, since the generated code amounts may not be calculated, the code amounts may not be predicted at a high bit rate. For this reason, the first pre-encoding unit 20 uses the CAVLC for code amount calculation.

As described above, if the code amount calculation is performed using the first pre-encoding unit 20, the circuit size can be reduced, processing can be reduced and simplified parallel pre-encoding can be performed. In addition, the code amount control unit 40 calculates the generated code amounts of the sorted quantization parameters QP through the interpolation process by using the generated code amounts obtained by the first pre-encoding unit 20. Moreover, the code amount control unit 40 decides the temporary quantization parameter QP_precode1 by comparing the obtained generated code amounts and the generated code amounts calculated through the interpolation process with the target code amount.

The second pre-encoding unit 30 performs pre-encoding again because it is assumed that an error exists in the temporary quantization parameter QP_precode1 using the results of the first pre-encoding, thereby improving the accuracy of the base quantization parameters used for the main encoding. That is, the second pre-encoding unit 30 calculates generated code amounts by performing the pre-encoding again with quantization parameters QP in the vicinity of the temporary quantization parameter QP_precode1 roughly estimated based on the results of the first pre-encoding. In addition, the second pre-encoding unit 30 calculates an optimal quantization parameter QP_precode2 corresponding to the generated code amount which is smaller than the target code amount and is located in the nearest position to the target code amount. Further, for entropy code length calculation in the second pre-encoding unit 30, coding (CABAC or CAVLC) used for the main encoding is used.

According to the second pre-encoding, the pre-encoding is performed with the temporary quantization parameter QP_precode1 decided through the first pre-encoding, and, for example, a quantization parameter QP_precode1+1 which is larger than the temporary quantization parameter QP_precode1 by 1 and a quantization parameter QP_precode1−1 which is smaller than the temporary quantization parameter QP_precode1 by 1. Herein, in order to reduce the circuit size, as described above, only the quantization section 33 and the code length calculating section 34 have the parallel configuration, and other processing elements are used in common.

At this time, a local decode image used for the in-screen prediction process is employed as data quantized with the temporary quantization parameter QP_precode1 decided through the first pre-encoding. That is, data processed in the quantization and IDCT corresponds to the output of quantization of the temporary quantization parameter QP_precode1. This represents that a local decode image of the temporary quantization parameter QP_precode1 is used as input of the in-screen prediction process of the pre-encoding using the quantization parameter QP_precode1+1 and the quantization parameters QP_precode1−1, instead of a local decode image of the quantization parameter QP_precode1+1 and the quantization parameter QP_precode1−1.

Further, an error exists due to the difference in the input of the in-screen prediction process. However, since the base quantization parameters are almost the same and distortions caused by encoding are almost the same, the error can be ignored.

<2. Coding Procedure>

Next, the coding procedure performed by the image coding apparatus will be described with reference to the flowchart of FIG. 2.

In Step ST1, the first pre-encoding unit 20 performs activity grouping. The first pre-encoding unit 20 calculates activity for each macro block to divide macro blocks into activity groups according to the activity values.

That is, if the case of dividing the macro blocks into groups of NumOfActivityGroup is assumed, the activity calculating section 26 decides the activity groups by comparing the activity with ActivityThreshold[0] to ActivityThreshold[NumOfActivityGroup−2]. Further, quantization parameters MB_QP of the macro blocks, which will be described later, are calculated by adding an offset (AdaptQpDelta[activity_group]) depending on the activity groups to base quantization parameters (BaseQP) of a picture as expressed by Equation 1 below.

$$MB\_QP = BaseQP + AdaptQpDelta[activity\_group] \quad \text{Equation 1}$$

For example, if the NumOfActivityGroup is set to 13, each value of the AdaptQpDelta, that is, AdaptQpDelta[13] can be "−6, −5, −4, −3, −2, −1, 0, 1, 2, 3, 4, 5, 6". Further, the activity is calculated using the sum of absolute values of errors of each image signal with respect to an average value of the image signals in the macro blocks, distribution of each image signal in the macro blocks and the like, and the flatness of an image of the macro blocks is expressed by the activity. Herein, when the activity is large, since the flatness of the image of the macro blocks is small, an offset is performed such that quantization parameters become small and a quantization step is reduced. Further, when the activity is small, since the flatness of the image of the macro blocks is large, the offset is performed such that quantization parameters become large and the quantization step is increased.

In Step ST2, the first pre-encoding unit 20 decides the in-screen prediction mode. The in-screen prediction mode decision section 21 of the first pre-encoding unit 20 decides the in-screen prediction mode based on the image signal. The in-screen prediction mode is used for the second pre-encoding of the second pre-encoding unit 30 and the main encoding of the encoding unit 50.

In Step ST3, the first pre-encoding unit 20 performs the generation of the difference image and the DCT operation. The in-screen prediction processing section 22 of the first pre-encoding unit 20 generates the image signal of the difference image representing the difference between the prediction image and the input image. The prediction image, for example, is generated from the input image for reducing processing. Then, the DCT section 23 performs the integer precision DCT and outputs the DCT coefficients to the quantization section 24.

In Step ST4, the first pre-encoding unit 20 calculates the code amounts based on the first pre-encoding. The quantization section 24 quantizes the DCT coefficient values with the discretely selected quantization parameters QP. The code length calculating section 25 calculates the generated code amounts of one picture by performing the code length calculation. At this time, the quantization parameters MB_QP of the macro blocks are encoded with the values reflecting the activity as described above. That is, as described above, the quantization parameters MB_QP of the macro blocks are calculated by adding the offset depending on the activity groups to the base quantization parameters of the picture.

Further, for compatibility with an adaptive Q matrix switching process, the above processing is performed for each Q matrix. That is, the pre-encoding is performed for each Q matrix by using the discretely selected quantization parameters QP, and the generated code amounts of one picture are obtained for each quantization parameter QP. At this time, the quantization parameters QP are selected such that the range in which the quantization parameters QP are obtained is covered in each Q matrix.

In Step ST5, the code amount control unit 40 corrects the generated code amounts obtained through the first pre-encoding. The code amount control unit 40 performs error correction by simplifying the pre-encoding. The error correction is performed using the fact that an error shows a tendency to a certain degree.

The first error cause is that not the local decode image but the input image is used for the in-screen prediction process. In such a case, since distortion due to codec is not present in an image used for the in-screen prediction, coding efficiency is improved as compared with actual encoding and smaller code amounts are obtained. Since the magnitude of the error depends on the magnitude of the distortion, the error becomes large when a bit rate is reduced in terms of the relationship between the generated code amount and the error. Further, the error becomes large when the quantization parameters QP become large in terms of the relationship between the quantization parameters QP and the error. Thus, the correction is performed in the state in which statistical data for the magnitude of the error is obtained in advance, and a model for an average error based on the bit rate and a model for the average error based on the quantization parameters QP are created.

The second error cause is derived from the selection of the CABAC for the entropy coding. Since the CABAC has coding efficiency superior to the CAVLC, when the pre-encoding is performed using the CAVLC, generated code amounts become large as compared with actual code amounts. For example, in terms of the relationship between the generated code amounts and the error, the magnitude of the error is statistically increased because the efficiency of the CABAC is improved if the bit rate is reduced. Similarly to this, the correction is performed in the state in which the statistical data for the magnitude of the error is obtained in advance and a model for the average error is created.

Further, as compared with the error in the in-screen prediction process based on the input image, it is apparent that an error caused by the CABAC is changed to an opposite side and the variation of the error is small. Consequently, the correction amount is defined as the relationship between the bit rate "r" and the quantization parameters QP "q'. When the correction ratio is defined as C (r, q), the correct code amount can be calculated by Equation 2 below.

$$\text{corrected code amount} = \text{Pre-Encode code amount} \\ C \times (r, q) \qquad \text{Equation 2}$$

In Step ST6, the code amount control unit 40 decides the temporary quantization parameter QP_precode1 corresponding to the target code amount. Since the code amount control unit 40 obtains the generated code amounts by performing the pre-encoding with the selected quantization parameters QP, the code amount control unit 40 calculates the generated code amounts through the interpolation process in relation to the sorted quantization parameters QP. In addition, the code amount control unit 40 compares the generated code amounts obtained through the pre-encoding and the code amounts calculated through the interpolation process with the target code amount, and employs a quantization parameter QP, which corresponds to the code amount smaller than the target code amount and located in the nearest position to the target code amount, as the temporary quantization parameter QP_precode1. In order to improve the prediction accuracy of the generated code amounts calculated through the interpolation process, the code amount control unit 40 changes the interpolation method according to the positions of quantization parameters used for calculating the generated code amount.

Further, for compatibility with the adaptive Q matrix switching process, the above processing is performed for each Q matrix. That is, for each Q matrix, the quantization parameter QP, which corresponds to the code amount smaller than the target code amount and located in the nearest position to the target code amount, is employed as the temporary quantization parameter QP_precode1. That is, for compatibility with the selection of the adaptive Q matrix, the first pre-encoding unit 20 discretely selects the quantization parameters QP of an acquisition range and performs the parallel process using the parallel circuit portion for each Q matrix. In addition, after the generated code amounts obtained through the parallel process and the code amounts calculated through the interpolation process are compared with the target code amount, for each Q matrix, the quantization parameter QP, which corresponds to the code amount smaller than the target code amount and located in the nearest position to the target code amount, is employed as the temporary quantization parameter QP_precode1.

<3. Q Matrix Switching Process>

Figure 3:
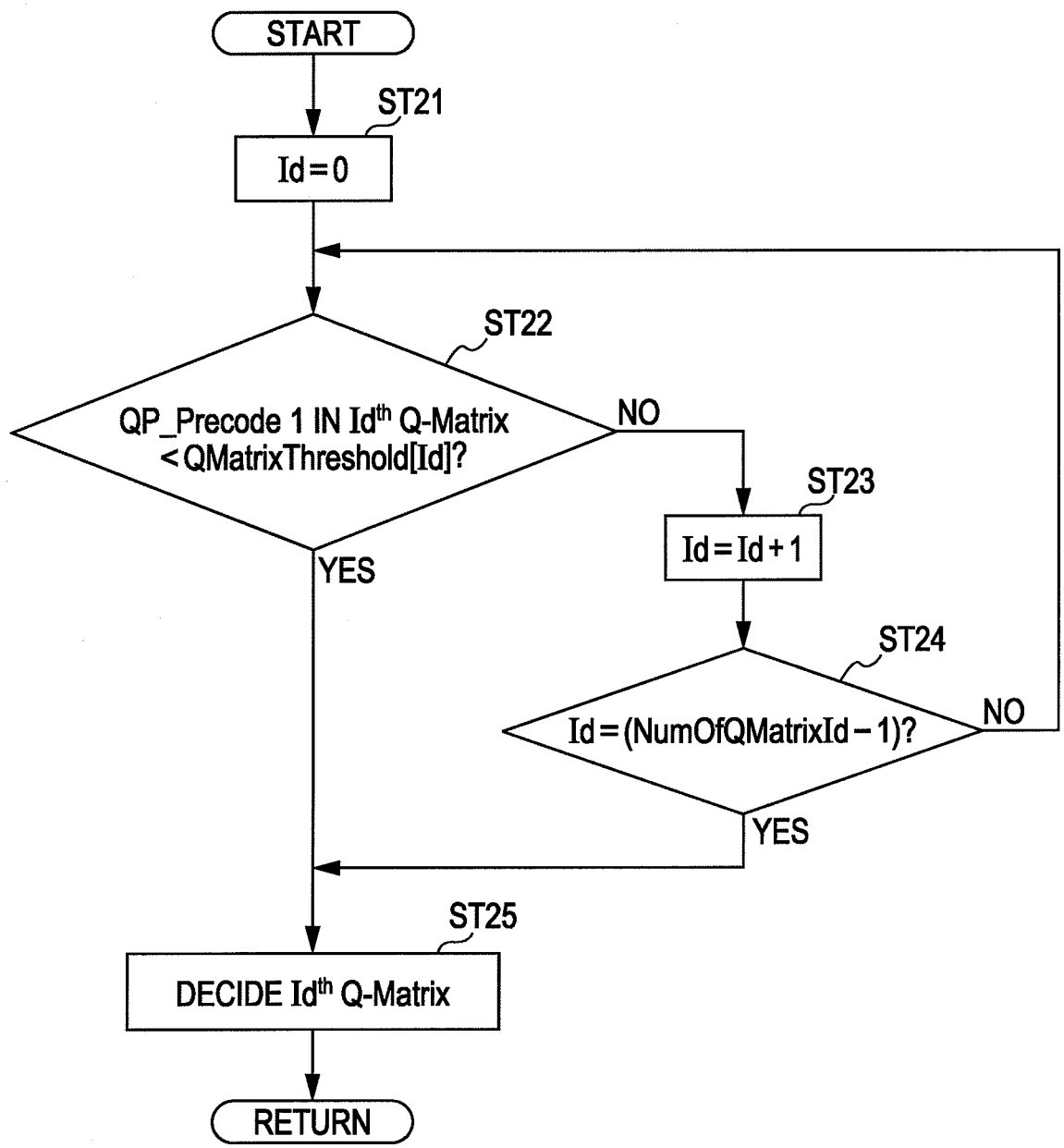
FIG. 3 is a flowchart illustrating an adaptive Q matrix switching process.

Hereinafter, the adaptive Q matrix switching process will be further described with reference to the flowchart of FIG. 3.

In the case of performing the adaptive Q matrix switching process, the selection of the Q matrix is adaptively performed according to the coding difficulty. As the coding difficulty, the temporary quantization parameter QP_precode1 decided for each Q matrix is used.

Herein, the number of Q matrices switched for use is defined as NumOfQMatrixId. Further, an Id is assigned in an ascending order from a Q matrix with a smooth slope, and obtained maximum quantization parameters QP of each Q matrix are defined as QMatrixThreshold[0] to QMatrixThreshold[NumOfQMatrixId−2].

In Step ST21, the code amount control unit 40 sets the value of the Id to 0 by performing Id initialization. In Step ST22, the code amount control unit 40 compares the temporary quantization parameter QP_precode1 with the QMatrixThreshold from a Q matrix having a small Id value. If the temporary quantization parameter QP_precode1 is smaller than the QMatrixThreshold[Id] in an $Id^{th}$ Q matrix, the code amount control unit 40 proceeds to Step ST25, decides the Id$^{th}$ Q matrix as the current Q matrix and completes the procedure.

In Step ST22, if the temporary quantization parameter QP_precode1 in the Q matrix of an Idth is equal to larger than the QMatrixThreshold[Id], the code amount control unit 40 increments the Id in Step ST23 and proceeds to Step ST24.

In Step ST24, the code amount control unit 40 determines whether the Id is equal to the number NumOfQMatrixId of Q matrices switched for use. Herein, if the Id is equal to the NumOfQMatrixId, the code amount control unit 40 returns to Step ST22 to check the next Q matrix. Further if the Id is equal to a NumOfQMatrixId−1, the code amount control unit 40 proceeds to Step ST25, selects the steepest Q matrix (Q matrix having an ID of NumOfQMatrixId−1) and completes the procedure.

With the above procedure, for each Q matrix, the code amount control unit 40 sets the obtained maximum quantization parameters QP, and determines whether the temporary quantization parameter QP_precode1 exists in the range sequentially starting from the Q matrix with the smooth slope. If the temporary quantization parameter QP_precode1 exists in the range, the temporary quantization parameter QP_precode1 is used.

Figure 2:
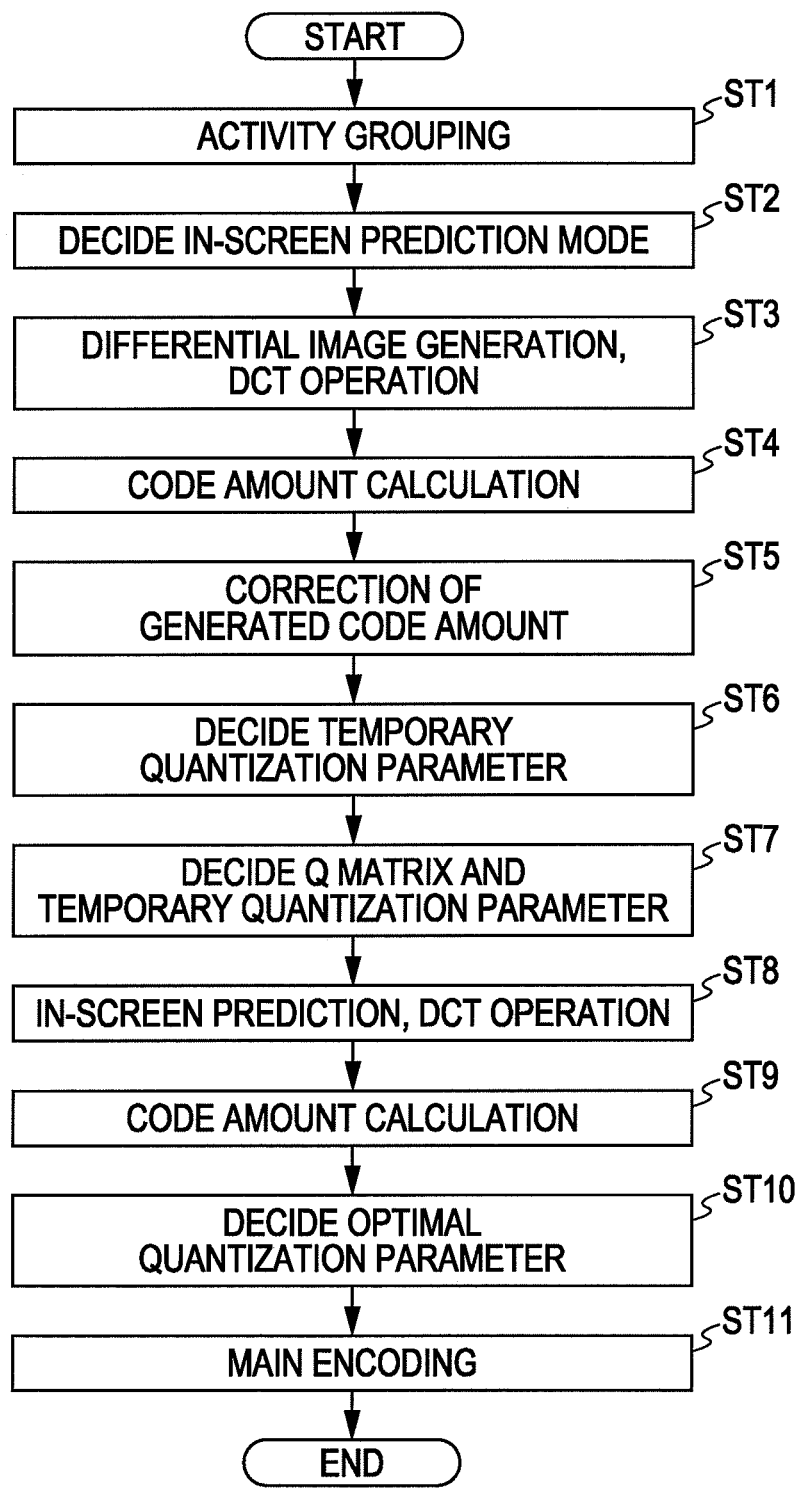
FIG. 2 is a flowchart illustrating the procedure of coding performed by an image coding apparatus.

In Step ST7 of FIG. 2, the code amount control unit 40 decides the Q matrix and the temporary quantization parameter QP_precode1. In detail, the code amount control unit 40 decides the Q matrix through the above process, and decides the temporary quantization parameter QP_precode1 according to the decision of the Q matrix. The Q matrix is selected as described above, so that the range of obtained quantization parameters QP is limited, and the range of quantization parameters QP for checking generated code amounts in the first pre-encoding can be reduced. These become the Q matrix and the temporary quantization parameter QP_precode1 decided through the first pre-encoding.

Then, in Steps ST8 to ST10, the second pre-encoding is performed. The purpose of the second pre-encoding is to improve the prediction accuracy of the base quantization parameters by performing the pre-encoding again because it is assumed that an error occurs in the temporary quantization parameter QP_precode1 decided through the first pre-encoding.

That is, the generated code amounts are calculated by performing the pre-encoding again with the quantization parameters QP in the vicinity of the temporary quantization parameter QP_precode1 which is the base quantization parameter roughly estimated through the first pre-encoding. Further, after the calculated generated code amounts are compared with the target code amount, the quantization parameter QP, which corresponds to the generated code amount smaller than the target code amount and located in the nearest position to the target code amount, is employed as the temporary quantization parameter QP_precode2. In the entropy code length calculation, the scheme (CABAC or CAVLC) used for the main encoding is used.

In Step ST8, the second pre-encoding unit 30 performs the in-screen prediction and the DCT. The in-screen prediction processing section 31 of the second pre-encoding unit 30 performs the in-screen prediction process by using the temporary quantization parameter QP_precode1, the Q matrix and the activity groups which are decided through the first pre-encoding and the like. Further, the DCT section 32 of the second pre-encoding unit 30 performs the DCT operation. According to the second pre-encoding, as a local decode image used for the in-screen prediction, data quantized with the temporary quantization parameter QP_precode1 decided through the first pre-encoding and the like is used in common.

In Step ST9, the second pre-encoding unit 30 calculates the code amounts based on the second pre-encoding. The second pre-encoding unit 30 calculates the code amounts with each quantization parameter QP of the second range based on the temporary quantization parameter QP_precode1. That is, the temporary quantization parameter QP_precode1 is provided to the quantization portion 33-1, so that the generated code amounts of the temporary quantization parameter QP_precode1 are calculated. Further, the quantization parameters QP_precode1−1 is provided to the quantization portion 33-2 and the quantization parameters QP_precode1+1 is provided to the quantization portion 33-3, so that the generated code amounts of the quantization parameters QP_precode1−1 and the quantization parameters QP_precode1+1 are calculated.

In Step ST10, the code amount control unit 40 decides the optimal quantization parameter QP_precode2. In detail, the code amount control unit 40 decides the optimal quantization parameter QP_precode2 by comparing the generated code amounts obtained through the second pre-encoding unit 30 with the target code amount. That is, the second pre-encoding unit 30 employs one of the temporary quantization parameter QP_precode1, the QP_precode1−1 and the QP_precode1+1, that is, the quantization parameter, which corresponds to the generated code amount smaller than the target code amount and located in the nearest position to the target code amount, as the temporary quantization parameter QP_precode2.

In Step ST11, the encoding unit 50 performs the main encoding. In detail, the encoding unit 50 performs the main encoding by using the temporary quantization parameter QP_precode2 decided through the second pre-encoding, and the Q matrix and the activity groups decided through the first pre-encoding. In this way, a series of procedures associated with the coding is completed.

<4. Temporary Quantization Parameter Decision Process>

The code amount control unit 40 performs the interpolation process by using the generated code amounts obtained by executing the pre-encoding with the quantization parameters QP discretely selected by the first pre-encoding unit 20, thereby calculating the generated code amounts corresponding to the unselected quantization parameters QP. In addition, the code amount control unit 40 decides the temporary quantization parameter QP_precode1 corresponding to the target code amounts by comparing the generated code amounts corresponding to the selected quantization parameters and the generated code amounts calculated through the interpolation process with the target code amount.

Figure 4:
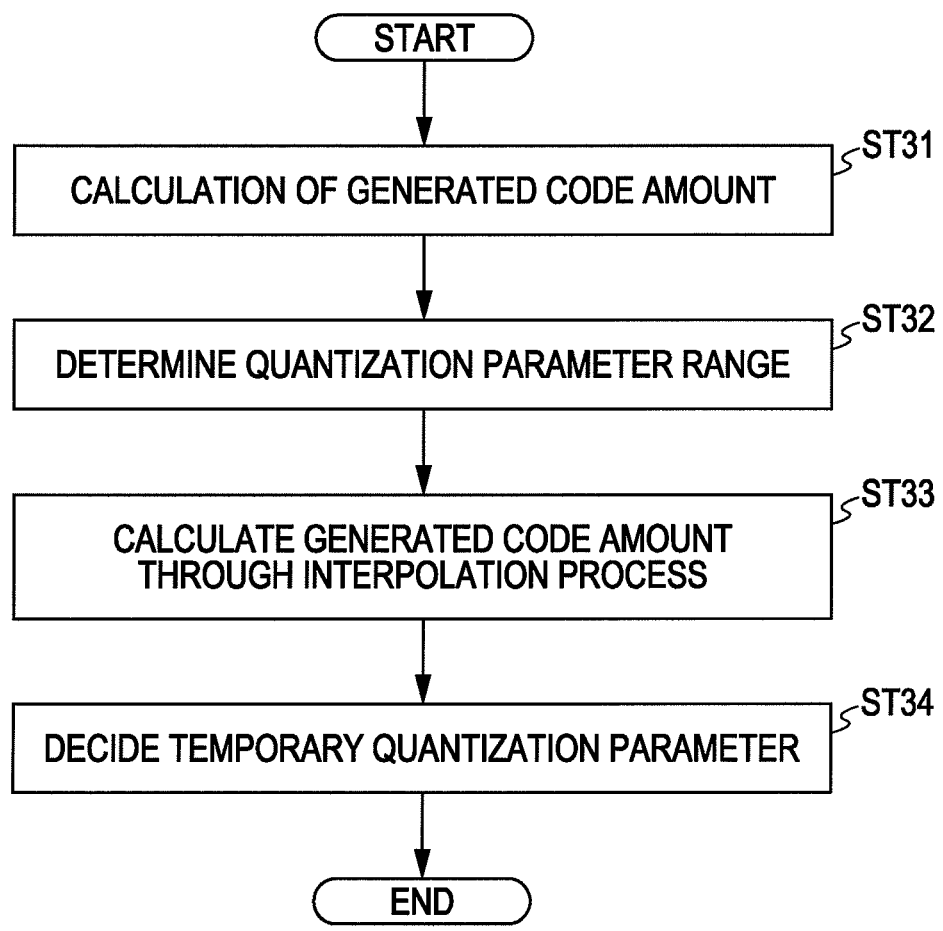
FIG. 4 is a flowchart illustrating a temporary quantization parameter decision process.

FIG. 4 is a flowchart illustrating the temporary quantization parameter decision process. Further, FIGS. 5A to 5D are graphs illustrating the temporary quantization parameter decision process. In Step ST31 of FIG. 4, the first pre-encoding unit 20 calculates generated code amounts by performing the pre-encoding for each of the discretely selected temporary quantization parameters QP, and proceeds to Step ST32. For example, in FIG. 5A, the first pre-encoding unit 20 calculates the generated code amounts with respect to the discretely selected temporary quantization parameters QP as indicated by black circles.

In Step ST32, the code amount control unit 40 determines a quantization parameter range WQ and proceeds to Step ST33. The code amount control unit 40 compares the target code amount "Target_bits" with the generated code amounts calculated in Step ST31, and determines whether a targeted base quantization parameter exists in the range indicated by the quantization parameters QP used for calculating the generated code amounts.

Figure 5A:
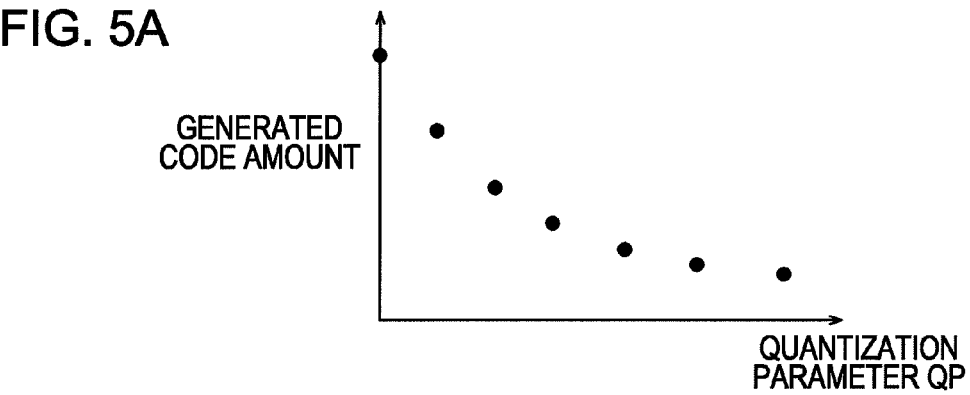
FIGS. 5A to 5D are graphs illustrating a temporary quantization parameter decision process.
Figure 5B:
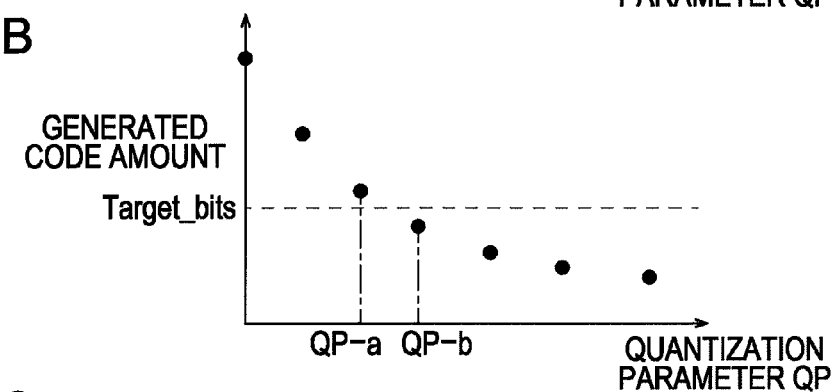

The code amount control unit 40, for example, compares the code amounts calculated in Step ST31 with the target code amount, and determines a quantization parameter "QP-a", which corresponds to the calculated generated code amount larger than the target code amount "Target_bits" and located in the nearest position to the target code amount as illustrated in FIG. 5B. Further, the code amount control unit 40 determines a quantization parameter "QP-b" which corresponds to the calculated generated code amount smaller than the target code amount "Target_bits" located in the nearest position to the target code amount. In addition, the code amount control unit 40 employs a range of the determined quantization parameters "QP-a" to "QP-b" as the quantization parameter range WQ including the targeted quantization parameter.

Figure 5C:
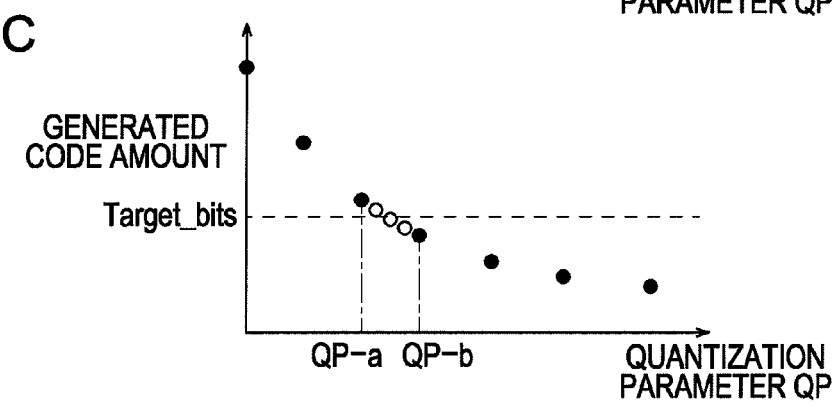

In Step ST33, the code amount control unit 40 calculates the generated code amounts through the interpolation process with respect to the sorted quantization parameters QP in the quantization parameter range WQ. The code amount control unit 40 calculates generated code amounts through the interpolation process with respect to each quantization parameter QP in the quantization parameter range WQ, that is, the range of "QP-a" to "QP-b" as illustrated in FIG. 5C. Herein, the code amount control unit 40 changes the interpolation method according to the positions of quantization parameters used for the generated code amounts through the interpolation process. The interpolation process will be described in detail later.

Figure 5D:
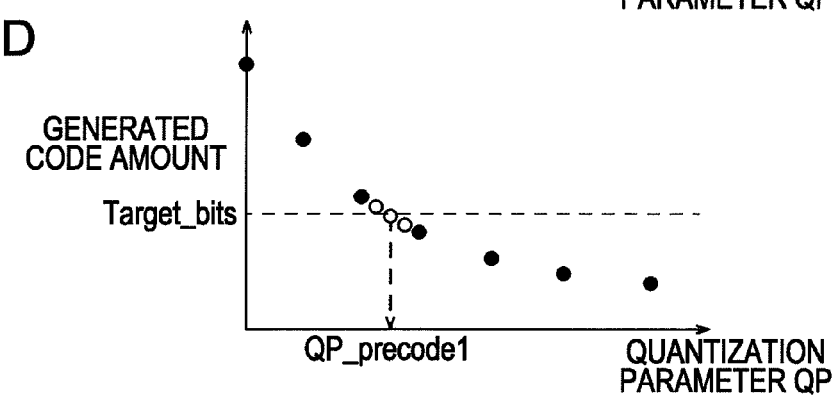

In Step ST34, the code amount control unit 40 decides the temporary quantization parameter QP_precode1. In detail, the code amount control unit 40 compares the generated code amounts calculated in Step ST31 and the generated code amounts through the interpolation process in Step ST33 with the target code amount. Further, the code amount control unit 40 employs the quantization parameter QP, which corresponds to the generated code amount smaller than the target code amount and located in the nearest position to the target code amount, as the temporary quantization parameter QP_precode1 as illustrated in FIG. 5D.

<5. Interpolation Process>

Figure 6:
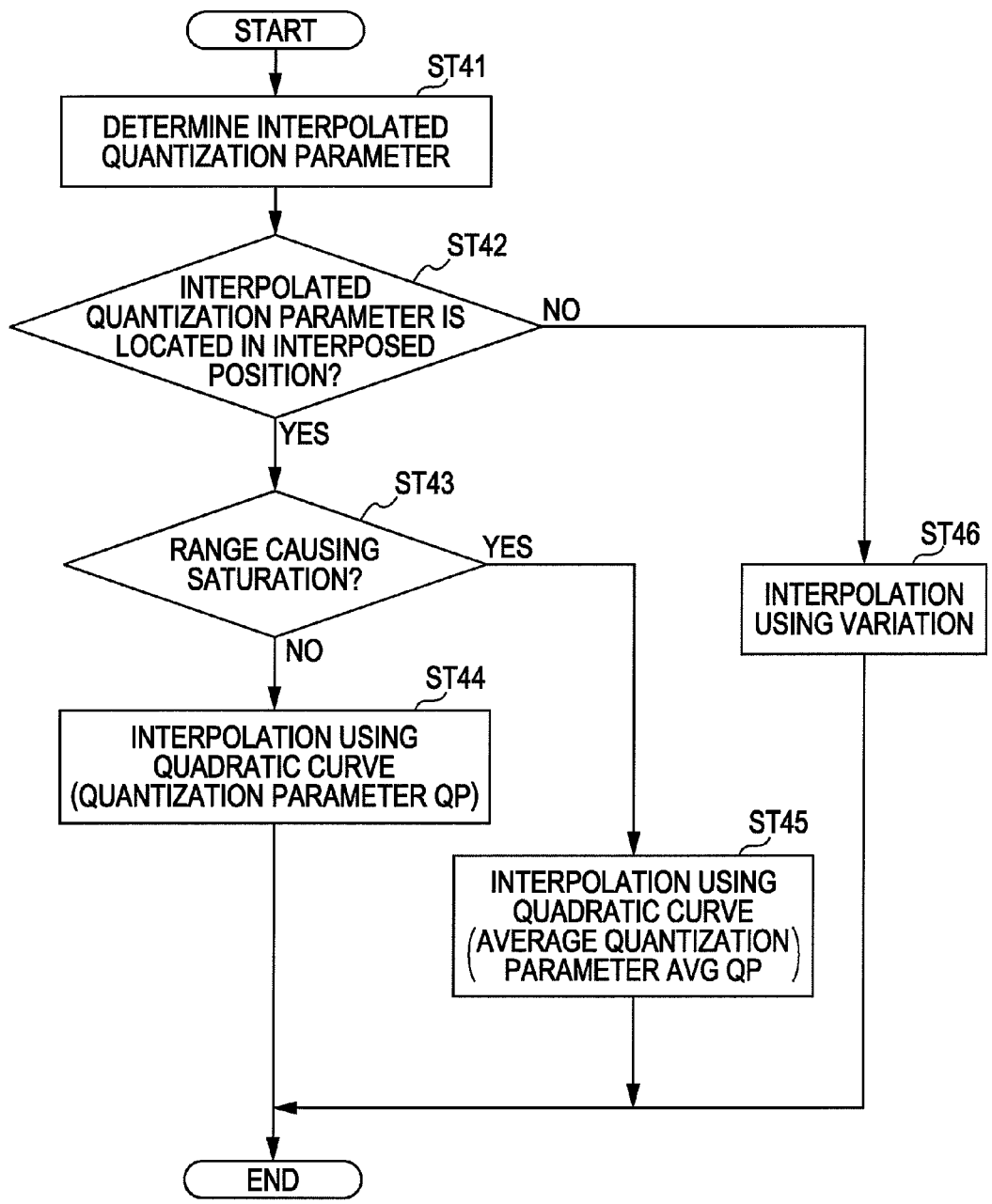
FIG. 6 is a flowchart illustrating the change of an interpolation process.

Next, the interpolation process will be described. The code amount control unit 40 compares the generated code amounts of the selected quantization parameters with the target code amount, and determines quantization parameters for calculating generated code amounts through the interpolation process. Further, the code amount control unit 40 changes the interpolation method according to the positions of the quantization parameters used for calculating the generated code amounts through the interpolation process. The code amount control unit 40, for example, performs any one of interpolation using a quadratic curve and interpolation using variation of generated code amounts according to the positions of the quantization parameters. Further, in the interpolation using the quadratic curve, the quantization parameters QP or the average quantization parameters AVG_QP are used. FIG. 6 is a flowchart illustrating the interpolation process switching operation.

In Step ST41, the code amount control unit 40 determines a quantization parameter to be interpolated. In detail, the code amount control unit 40 compares the generated code amounts of the selected quantization parameters with the target code amount, and determines a quantization parameter between two selected quantization parameters QP, which correspond to the generated code amounts between which the target code amount exists, as the quantization parameter to be interpolated. Further, when the target code amount is larger than generated code amounts corresponding to minimally selected quantization parameters QP, the code amount control unit 40 determines a quantization parameter, which is smaller than the minimally selected quantization parameters QP, as the quantization parameter to be interpolated. In addition, when the target code amount is smaller than generated code amounts corresponding to maximally selected quantization parameters QP, the code amount control unit 40 determines a quantization parameter, which is larger than the maximally selected quantization parameters QP, as the quantization parameter to be interpolated. Through the above process, the code amount control unit 40 can efficiently select the quantization parameter to be interpolated, and it is not necessary to perform interpolation with respect to all quantization parameters QP which are not selected.

In Step ST42, the code amount control unit 40 determines whether the position of the quantization parameter to be interpolated exists between the selected quantization parameters QP. When the positions of quantization parameters for calculating the generated code amounts through the interpolation process exist between the quantization parameters QP selected by the first pre-encoding unit 20, the code amount control unit 40 proceeds to Step ST43. However, when the positions of quantization parameters for calculating the generated code amounts through the interpolation process do not exist between the quantization parameters QP selected by the first pre-encoding unit 20, the code amount control unit 40 proceeds to Step ST46.

In Step ST43, the code amount control unit 40 determines whether the position of the quantization parameter to be interpolated exists in an area of quantization parameters, which are limited to a preset range when an offset corresponding to an activity has been added. When the position of the quantization parameter to be interpolated does not exist in the area limited to the preset range, the code amount control unit 40 proceeds to Step ST44. However, when the position of the quantization parameter to be interpolated exists in the limited area, the code amount control unit 40 proceeds to Step ST45.

Herein, when calculating the quantization parameters MB_QP of the macro blocks by adding the offset (AdaptQp-Delta[activity_group]) depending on the activity groups to the base quantization parameters (BaseQP) of a picture, since the offset is added thereto, a case may occur in which the quantization parameters are limited to the preset range. For example, with respect to the base quantization parameters (BaseQP), for example, as described above, the NumOfActivityGroup is set to "13" and the offset is set to "−6, −5, −4, −3, −2, −1, 0, 1, 2, 3, 4, 5, 6". Further, the range of the quantization parameters is set to "0 to 51". In such a case, in the range of "0 to 6" and "45 to 51" in which the base quantization parameters (BaseQP) exist, when the offset is added, the quantization parameters are limited to the preset range of "0 to 51". Thus, when the position of the quantization parameter to be interpolated does not exist in the area of "0 to 6" and "45 to 51", the code amount control unit 40 proceeds to Step ST44. However, when the position of the quantization parameter to be interpolated exists in the area of "0 to 6" and "45 to 51", the code amount control unit 40 proceeds to Step ST45.

In Step ST44, the code amount control unit 40 performs the interpolation using the quadratic curve to calculate generated code amounts corresponding to the quantization parameters QP. In detail, the code amount control unit 40 determines two selected quantization parameters QP between which the quantization parameter to be interpolated exists, and a quantization parameter QP, which has a large value (or a small value) and is subsequent to the two selected quantization parameters QP. Then, the code amount control unit 40 decides a quadratic curve from values of the determined three quantization parameters QP and generated code amounts corresponding to these values. In addition, the code amount control unit 40 calculates a generated code amount corresponding to the quantization parameter to be interpolated by using the decided quadratic curve, and completes the interpolation process.

In Step ST45, the code amount control unit 40 performs the interpolation using the quadratic curve to calculate generated code amounts corresponding to the average quantization parameters AVG_QP. In detail, the code amount control unit 40 converts the two selected quantization parameters QP, between which the quantization parameter to be interpolated exists, and the quantization parameter QP, which has a large value (or a small value) and is subsequent to the two selected quantization parameters QP, into the average quantization parameters AVG_QP. Further, the code amount control unit 40 converts the quantization parameter to be interpolated into the average quantization parameter AVG_QP. Then, the code amount control unit 40 decides a quadratic curve from values of the three average quantization parameters AVG_QP and generated code amounts corresponding to these values. In addition, the code amount control unit 40 calculates generated code amounts corresponding to the average quantization parameters AVG_QP to be interpolated by using the decided quadratic curve, and completes the interpolation process.

In the conversion to the average quantization parameters AVG_QP, the quantization parameters MB_QP of the macro blocks in each activity group are calculated based on the Equation 1 above.

Further, when the quantization parameters MB_QP are set to a range of "0≤MB_QP≤51" and the value calculated from Equation 1 exceeds the range of "0≤MB_QP≤51", the value is clipped to this range.

Then, a macro block quantization parameter integration value SUM_QP_ag is calculated for each activity group by multiplying the quantization parameters MB_QP of the macro blocks by the number MB_Nag of the macro blocks, which belongs to the activity group, as illustrated in Equation 3.

$$SUM\_QP\_ag = MB\_QP \times MB\_Nag \qquad \text{Equation 3}$$

In addition, the average quantization parameters AVG_QP can be calculated by dividing the sum of the macro block quantization parameter integration values SUM_QP_ag of each activity group by the total number of the macro blocks of the picture.

In this way, the quantization parameters QP can be converted into the average quantization parameters AVG_QP. Further, the average quantization parameters represent the average value of quantization parameters of each macro block, for which the offset process has been performed based on the activity.

Figure 7A:
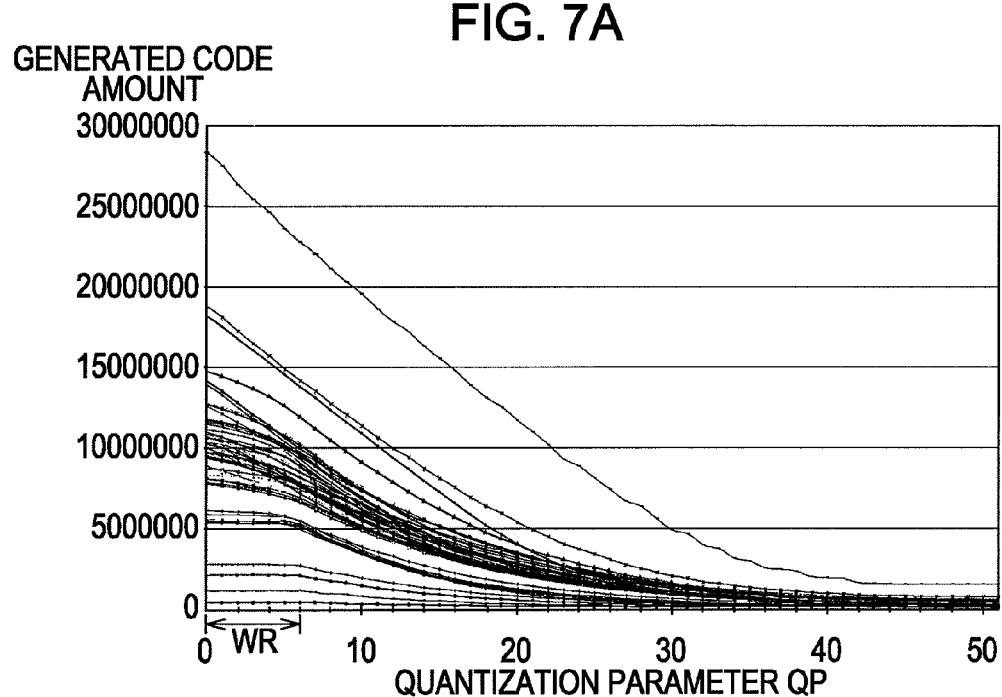
FIGS. 7A and 7B are graphs illustrating the relationship between quantization parameters and generated code amounts.
Figure 7B:
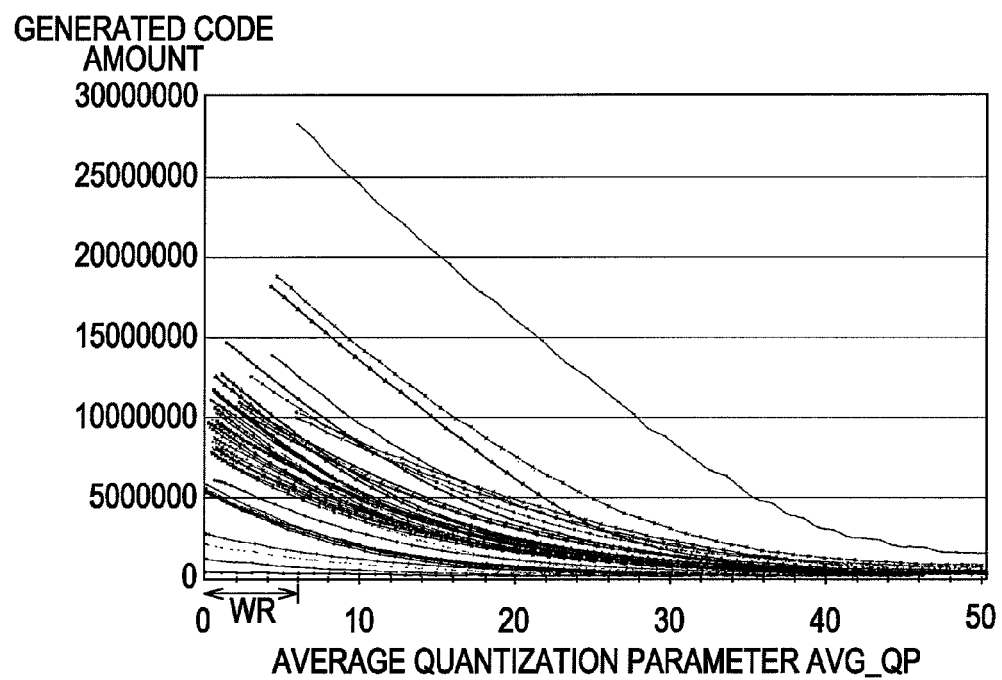

FIGS. 7A and 7B illustrate the relationships of the quantization parameters and the generated code amounts with respect to various materials. FIG. 7A illustrates the relationship of the base quantization parameters and the generated code amounts and FIG. 7B illustrates the relationship of the average quantization parameters and the generated code amounts. In terms of the relationship of the base quantization parameters and the generated code amounts, for example, when the quantization parameters exist in a range WR of "0 to 6", a case may occur in which the quantization parameters are limited to the range of "0 to 51" even if the offset process has been performed. Thus, a case may occur in which the characteristics of the range WR vary depending on materials as illustrated in FIG. 7A. For example, since the quantization parameters are limited to the range of "0 to 51" even if the offset process has been performed, a case may occur in which the generated code amounts are not changed even when the quantization parameters are small. However, if the average quantization parameters are used, even in the range in which the quantization parameters are seen to be saturated when the offset process has been performed, uniform characteristics are obtained regardless of materials as illustrated in FIG. 7B. Thus, in the case of performing the interpolation using the quadratic curve with respect to the range in which the quantization parameters are seen to be saturated when the offset process has been performed, it is possible to improve the interpolation accuracy by using the average quantization parameters.

In Step ST46, the code amount control unit 40 performs interpolation using variation. In detail, the code amount control unit 40 calculates variation from the generated code amounts of the selected quantization parameters, and performs the interpolation using the calculated variation in an interval of the quantization parameters used for calculating the variation. For example, when the interval of the selected quantization parameters is set to "1", the code amount control unit 40 calculates generated code amounts corresponding to the quantization parameters to be interpolated from the variation and the intervals of the selected quantization parameters and the quantization parameters to be interpolated, and completes the interpolation process. When the interval is larger than "1", the code amount control unit 40 uses the generated code amounts obtained by performing the interpolation in the interval of the quantization parameters used for calculating the variation, and calculates generated code amounts of quantization parameters, which exist in the interval of the quantization parameters used for calculating the variation, through linear interpolation.

Figure 8:
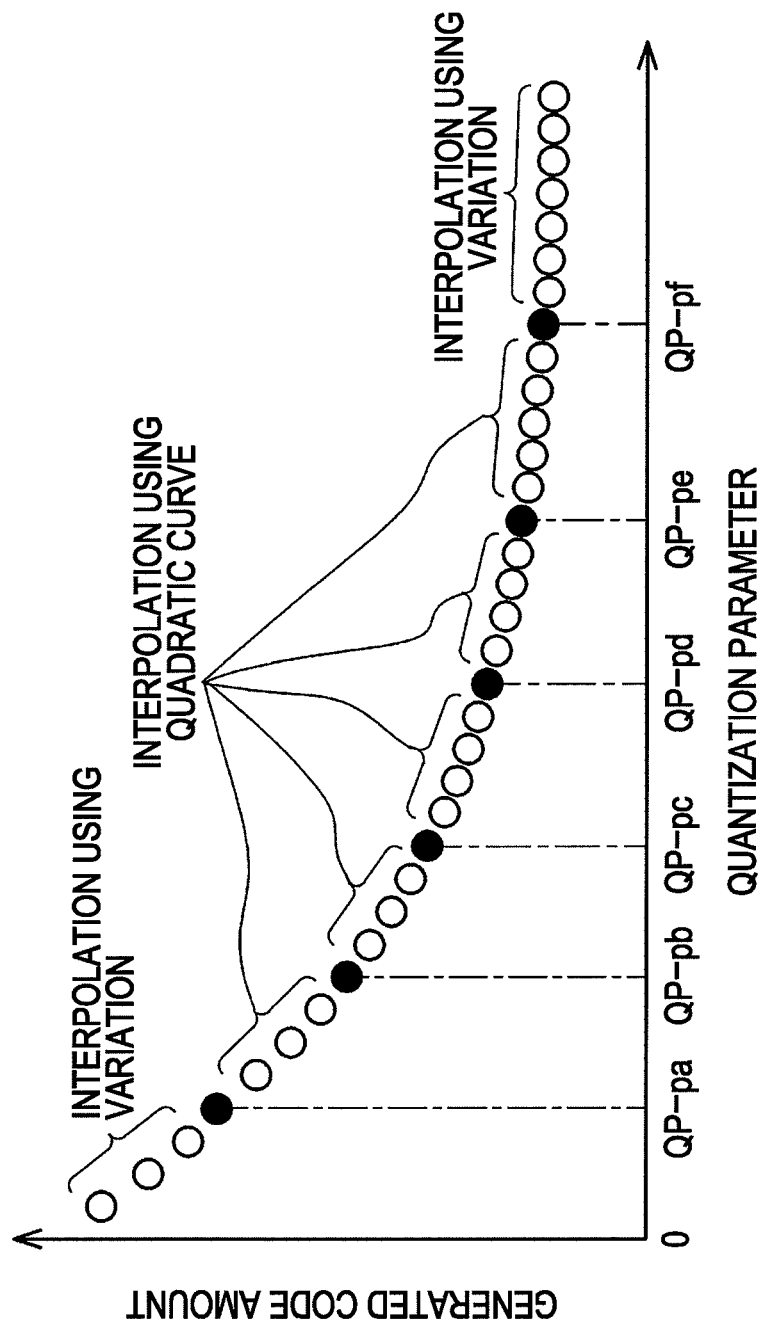
FIG. 8 is a graph illustrating the relationship between quantization parameters used for calculating generated code amounts and an interpolation method.

FIG. 8 is a graph illustrating the relationship between the positions of the quantization parameters used for calculating the generated code amounts through the interpolation process and an interpolation method. In FIG. 8, black circles indicate the generated code amounts of the quantization parameters selected by the first pre-encoding unit 20.

When the positions of the quantization parameters used for calculating the generated code amounts through the interpolation process exist between the quantization parameters selected by the first pre-encoding unit 20, the code amount control unit 40 performs the interpolation using the quadratic curve. Further, when the range WQ of quantization parameters including a targeted base quantization parameter is smaller than the range of minimal quantization parameters selected by the first pre-encoding unit 20, the code amount control unit 40 performs the interpolation using the variation. In addition, when the range WQ of the quantization parameters including the targeted base quantization parameter is larger than the range of maximal quantization parameters selected by the first pre-encoding unit 20, the code amount control unit 40 performs the interpolation using the variation.

The quantization parameters QP selected by the first pre-encoding unit 20, for example, are defined as "QP-pa", "QP-pb", "QP-pc", "QP-pd", "QP-pe" and "QP-pf" as illustrated in FIG. 8. When the range WQ of the quantization parameters including the targeted base quantization parameter is "QP-pa" to "QP-pb", the code amount control unit 40 calculates the generated code amounts of the sorted quantization parameters through the interpolation using the quadratic curve. Further, when the range WQ of the quantization parameters is "QP-pb" to "QP-pc", "QP-pc" to "QP-pd", "QP-pd" to "QP-pe" or "QP-pf" to "QP-pf", the code amount control unit 40 calculates the generated code amounts through the interpolation using the quadratic curve. When the range WQ of the quantization parameters including the targeted base quantization parameter is less than "QP-pa", the code amount control unit 40 calculates the generated code amounts of the sorted quantization parameters through the interpolation using the variation. When the range WQ of the quantization parameters including the targeted base quantization parameter is equal to or larger than "QP-pf", the code amount control unit 40 calculates the generated code amounts of the sorted quantization parameters through the interpolation using the variation.

<6. Interpolation using Quadratic Curve>

Figure 9:
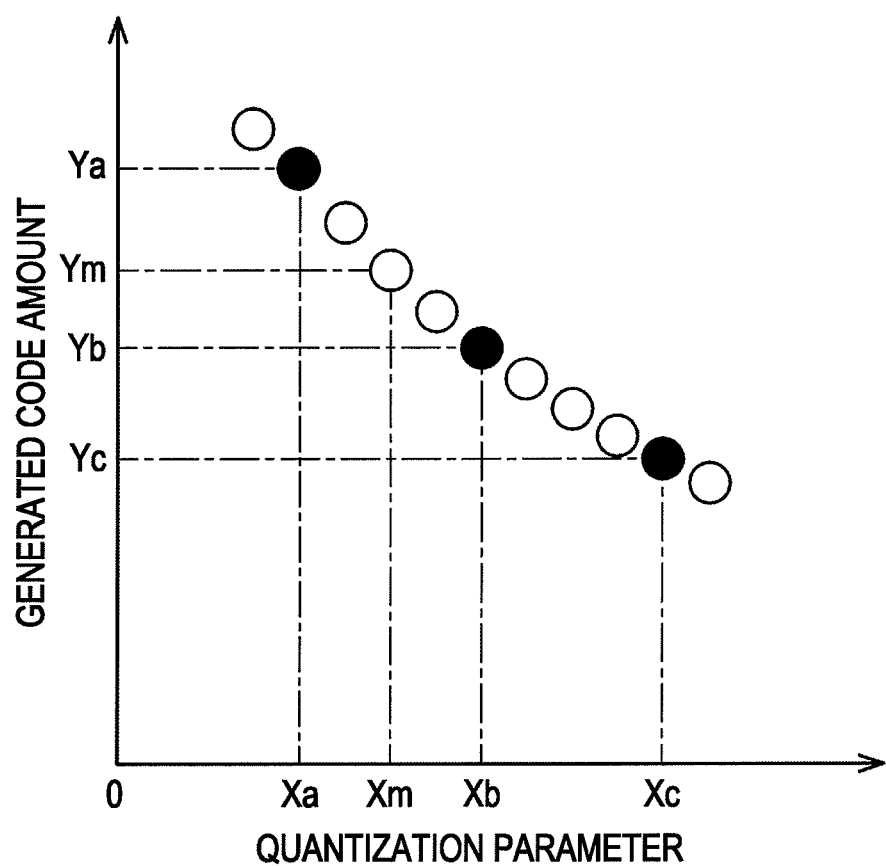
FIG. 9 is a graph illustrating a method of calculating generated code amounts through interpolation using a quadratic curve.

FIG. 9 is a graph illustrating a method of calculating the generated code amounts through the interpolation using the quadratic curve. According to the interpolation using the quadratic curve, the three quantization parameters QP selected by the first pre-encoding unit 20 are sequentially used. For example, a generated code amount when the value of the quantization parameter QP (or the average quantization parameter AVG_QP) is "Xa" is defined as "Ya", a generated code amount when the value "Xb" is defined as "Yb", and a generated code amount when the value "Xc" is defined as "Yc". At this time, the code amount control unit 40 calculates a generated code amount "Ym" when the value of the quantization parameter QP (or the average quantization parameter AVG_QP) is "Xm" by using Equation 4 below.

$$Ym = Ya \times (Xm-Xb) \times (Xm-Xc)/(Xa-Xb)/(Xa-Xc) + Yb \times (Xm-Xa) \times (Xm-Xc)/(Xb-Xa)/(Xb-Xc) + Yc \times (Xm-Xa) \times (Xm-Xb)/(Xc-Xa)/(Xc-Xb)$$ Equation 4

Thereafter, the code amount control unit 40 determines a generated code amount which is smaller than the target code amount and is located in the nearest position to the target code amount, and employs a quantization parameter QP corresponding to the determined generated code amount as the temporary quantization parameter QP_precode1.

Further, in the case of using the average quantization parameter AVG_QP, the code amount control unit 40 determines a generated code amount which is smaller than the target code amount and is located in the nearest position to the target code amount, and selects an average quantization parameter corresponding to the determined generated code amount. In addition, the code amount control unit 40 determines a quantization parameter QP converted to obtain the selected average quantization parameter, and employs the determined quantization parameter QP as the temporary quantization parameter QP_precode1.

Figure 10:
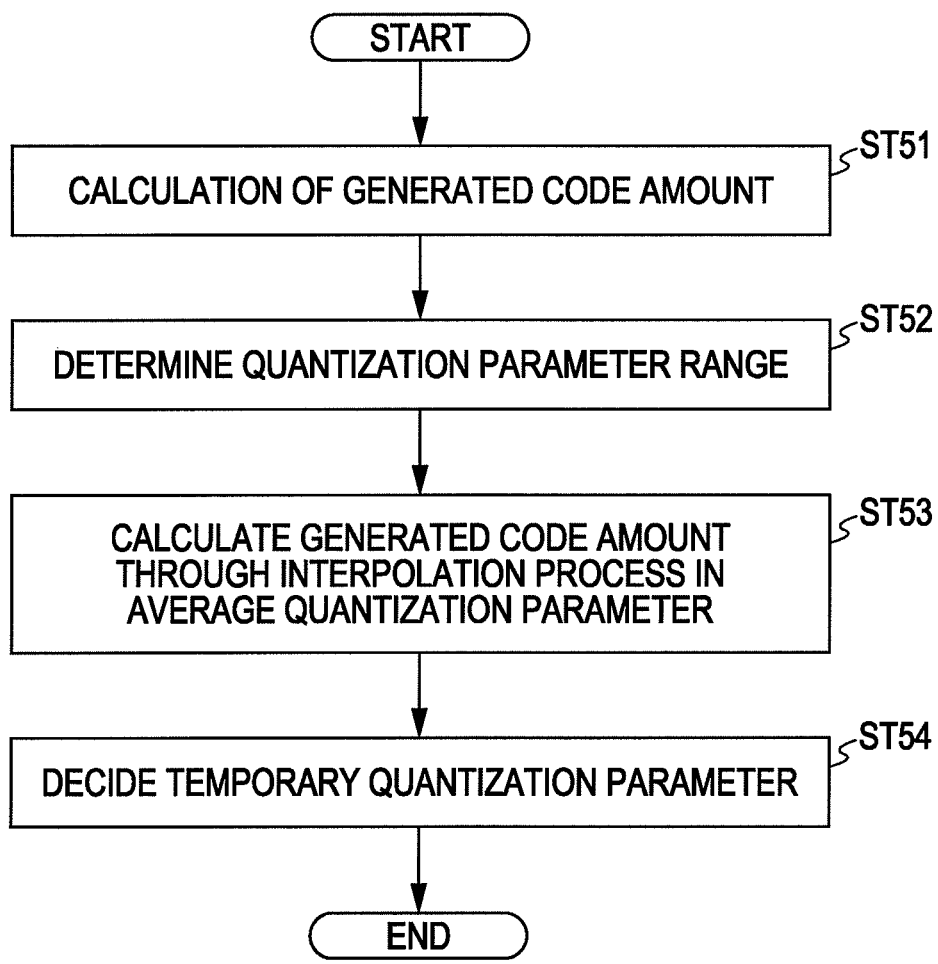
FIG. 10 is a flowchart illustrating a temporary quantization parameter decision process using average quantization parameters.

FIG. 10 is a flowchart illustrating a decision process of the temporary quantization parameter using the average quantization parameter, and FIGS. 11A to 11D are graphs illustrating the decision process of the temporary quantization parameter using the average quantization parameter. In Step ST51 of FIG. 10, the first pre-encoding unit 20 performs calculation of generated code amounts. The first pre-encoding unit 20 performs pre-encoding for each of the discretely selected quantization parameters QP, and calculates the generated code amounts. Then, Step ST52 is performed. For example, in FIG. 11A, the first pre-encoding unit 20 calculates the generated code amounts with respect to the discretely selected quantization parameters QP as indicated by black circles.

In Step ST52, the code amount control unit 40 determines the quantization parameter range WQ and proceeds to Step ST53. The code amount control unit 40 compares the target code amount "Target_bits" with the generated code amounts calculated in Step ST51, and determines a range in which a targeted quantization parameter QP is indicted by the quantization parameters QP used for calculating the generated code amounts.

Figure 11A:
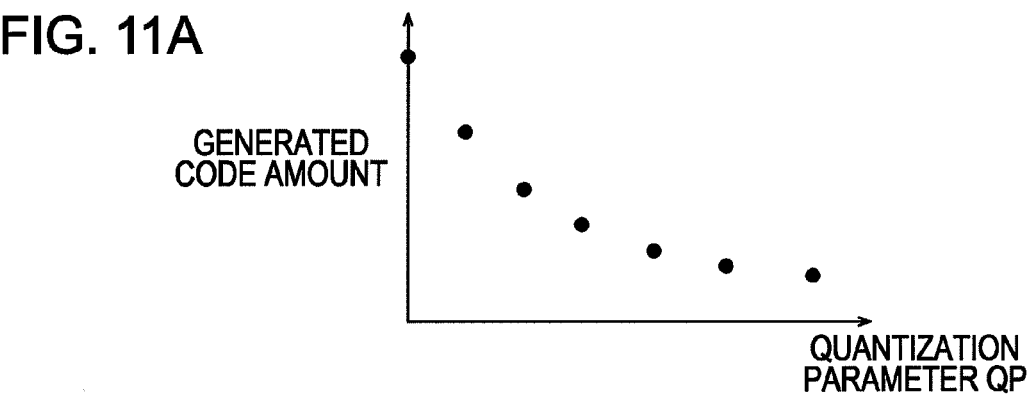
FIGS. 11A to 11D are graphs illustrating a temporary quantization parameter decision process using average quantization parameters.
Figure 11B:
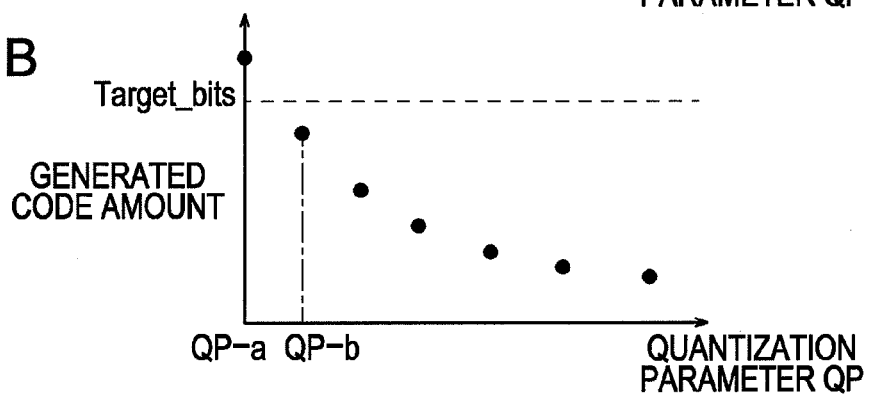
Figure 11C:
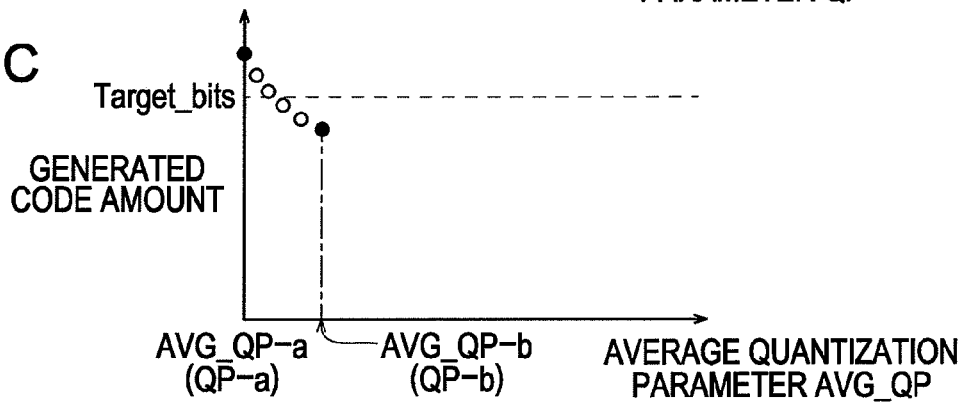

The code amount control unit 40, for example, compares the code amounts calculated in Step ST51 with the target code amount, and determines a quantization parameter "QP-a" which corresponds to the calculated generated code amount larger than the target code amount "Target_bits" and located in the nearest position to the target code amount as illustrated in FIG. 11B. Further, the code amount control unit 40 determines a quantization parameter "QP-b" which corresponds to the calculated generated code amount smaller than the target code amount "Target_bits" and located in the nearest position to the target code amount. In addition, the code amount control unit 40 employs the range of the determined quantization parameters "QP-a" to "QP-b" as the quantization parameter range WQ including the targeted quantization parameter.

In Step ST53, the code amount control unit 40 calculates generated code amounts by performing the interpolation process using the average quantization parameters with respect to the sorted quantization parameters QP in the quantization parameter range WQ, similarly to Step ST45 of FIG. 6. The code amount control unit 40 converts the quantization parameters of the quantization parameter range WQ and the quantization parameters obtained through the interpolation into average quantization parameters. For example, the code amount control unit 40 converts the quantization parameters QP-a and QP-b and the quantization parameters QP of the range of "QP-a" to "QP-b" into the average quantization parameter AVG_QP. Further, the code amount control unit 40 calculates generated code amounts by performing the interpolation process with respect to the converted average quantization parameter AVG_QP of the range of "QP-a" to "QP-b" as indicated by white circles of FIG. 11C.

Figure 11D:
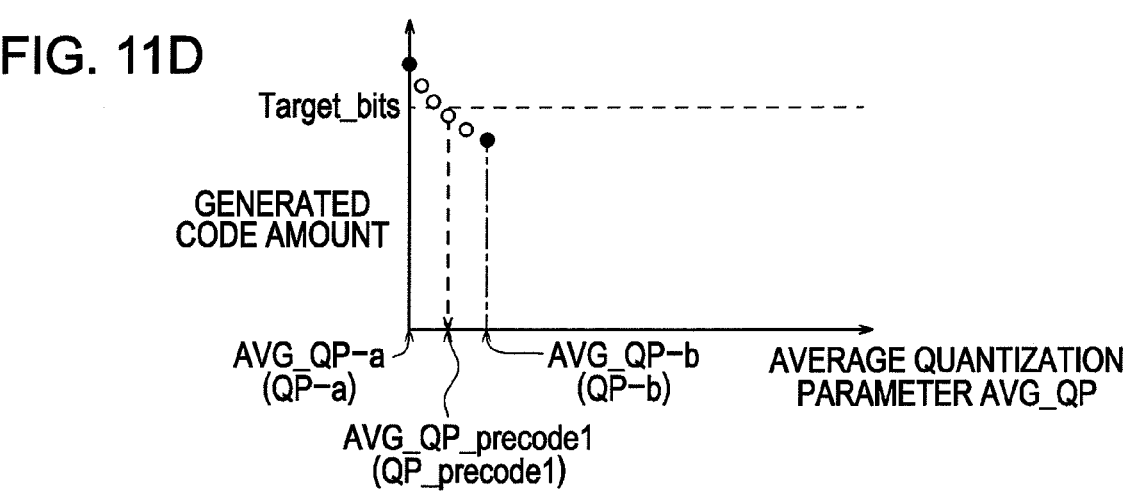

In Step ST54, the code amount control unit 40 decides the temporary quantization parameter QP_precode1. In detail, the code amount control unit 40 compares the generated code amounts calculated in Step ST51 and the generated code amounts calculated through the interpolation process in Step ST53 with the target code amount. Further, as illustrated in FIG. 11D, the code amount control unit 40 employs the average quantization parameter AVG_QP, which corresponds to the generated code amount smaller than the target code amount and located in the nearest position to the target code amount, as a temporary average quantization parameter AVG_QP_precode1. In addition, the code amount control unit 40 determines a quantization parameter QP converted to obtain the average quantization parameter AVG_QP_precode1, and employs the determined quantization parameter as the temporary quantization parameter QP_precode1.

Figure 12:
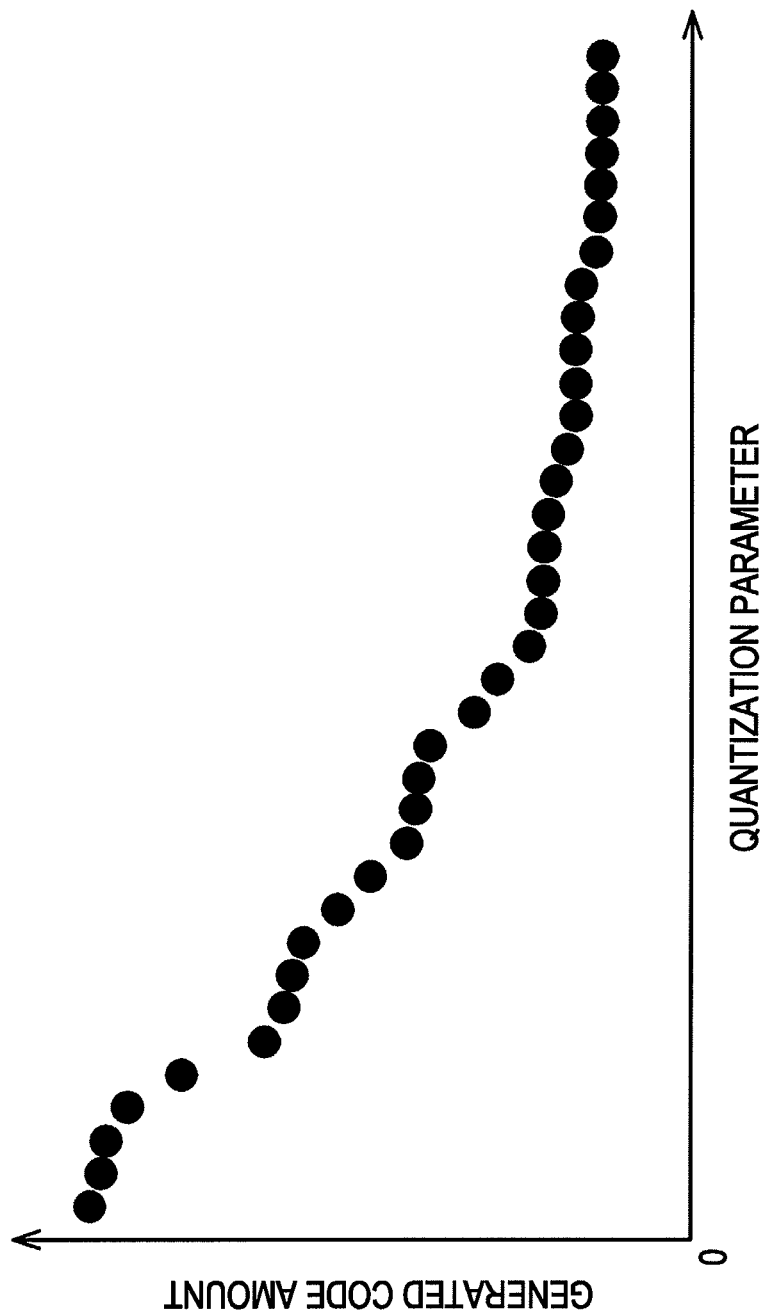
FIG. 12 is a graph exemplifying generated code amounts when using a re-encoding material.

As described above, the interpolation using the quadratic curve is performed, so that the accuracy can be improved as compared with existing linear interpolation. That is, a material used for predicting a code amount through pre-encoding is not limited to an original image. For example, an image (hereinafter, referred to as a re-encoding material), for which encoding and decoding have been performed, is also used. In general, in the case of a re-encoding material and the like, for which encoding and decoding have been performed using MPEG or AVC, the relationship between the quantization parameter QP and the code amounts is not smoothly changed, and exhibits characteristics in which the curve has a stair-step shape as illustrated in FIG. 12.

Figure 13:
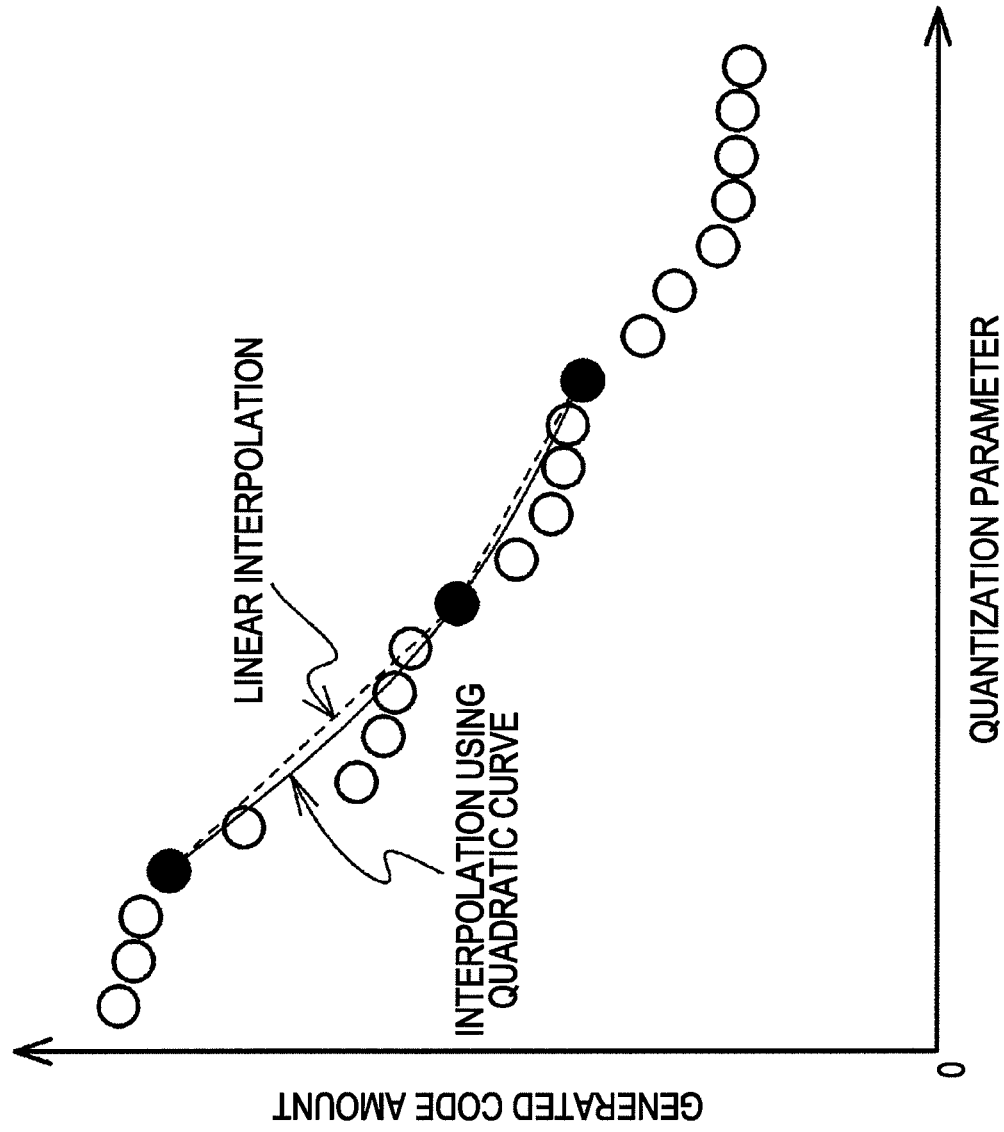
FIG. 13 is a graph illustrating a comparison between linear interpolation and interpolation using a quadratic curve.

FIG. 13 is a graph illustrating linear interpolation and interpolation using the quadratic curve in coding of a re-encoding material and the like. In FIG. 13, the linear interpolation is indicted by a broken line and the quadratic curve is indicated by a solid line. If generated code amounts are calculated through the linear interpolation, an error for actual generated code amounts may be increased. However, if the quadratic curve is used, the error for the actual generated code amounts is reduced, so that the accuracy can be improved as compared with the case of using linear interpolation.

<7. Interpolation Using Variation>

In relation to the interpolation using the variation of generated code amounts, the code amount control unit 40 calculates the variation from generated code amounts from selected quantization parameters, and performs the interpolation using the calculated variation in an interval of the quantization parameters used for calculating the variation.

Figure 14:
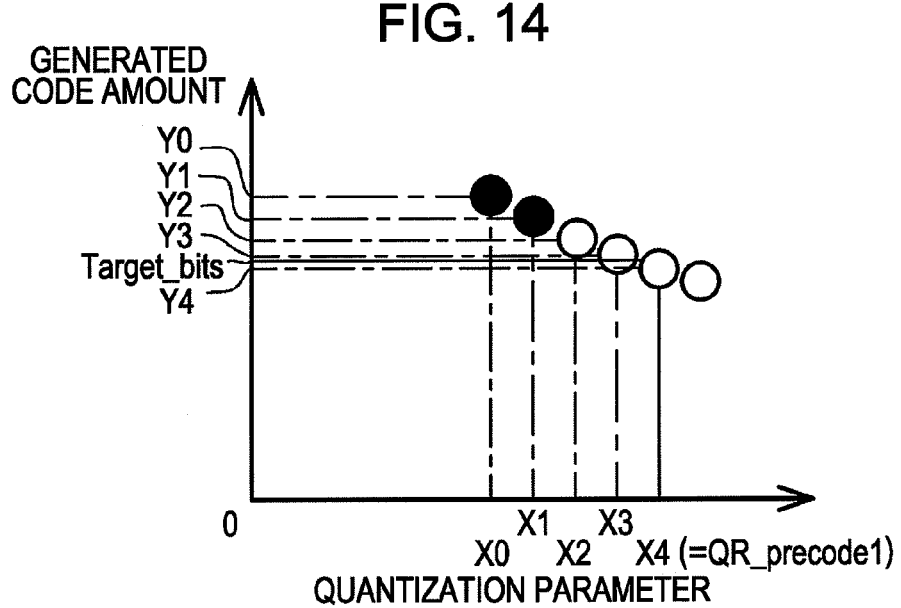
FIG. 14 is a graph illustrating an interpolation method using an increasing rate.

FIG. 14 is a graph illustrating an interpolation method using an increasing rate. This interpolation process is used when the target code amount is smaller than the code amount calculated by the first pre-encoding unit 20 and the difference between QPs used as reference points of the interpolation process is 1. Further, for example, a code amount when a quantization parameter QP is "X0" is defined as "Y0" and a code amount when the quantization parameter QP is "X1" is defined as "Y1". The code amount control unit 40 calculates variation RT from the code amounts calculated by the first pre-encoding unit 20 based on Equation 5 below.

$$RT=(Y1-Y0)/Y0 \quad \text{Equation 5}$$

The code amount control unit 40 calculates a generated code amount of a quantization parameter QP based on Equation 6 below, which is larger than a previously calculated generated code amount of a quantization parameter QP by "1", from the previously calculated generated code amount and the variation RT obtained through Equation 5. In Equation 6, a generated code amount when the quantization parameter QP corresponding to the previously calculated generated code amount is "Xp" is defined as "Yp", and a generated code amount when the quantization parameter QP larger than "Xp" by "1" is "Xp+1" is defined as "Yp+1".

$$Yp+1=Yp\times(1+RT) \quad \text{Equation 6}$$

In this way, the code amount control unit 40 sequentially performs the calculation of code amounts based on Equation 6, which correspond to quantization parameters QP having values larger than that of quantization parameters QP used for calculating generated code amounts. For example, a generated code amount "Y2" when a quantization parameter QP is "X2" larger than "X1" by "1" is equal to (Y1×Y1/Y0) from Equation 6. Further, a generated code amount "Y3" when a quantization parameter QP is "X3" larger than "X1" by "2" is equal to (Y2×Y1/Y0) from Equation 6.

Thereafter, when the calculated generated code amount is equal to or less than the target code amount, the quantization parameter QP at this time is employed as the temporary quantization parameter QP_precode1. For example, in FIG. 14, when a quantization parameter QP is "X4", since the calculated generated code amount is equal to or less than the target code amount, the quantization parameter QP "X4" at this time is decided as the temporary quantization parameter QP_precode1.

Figure 15:
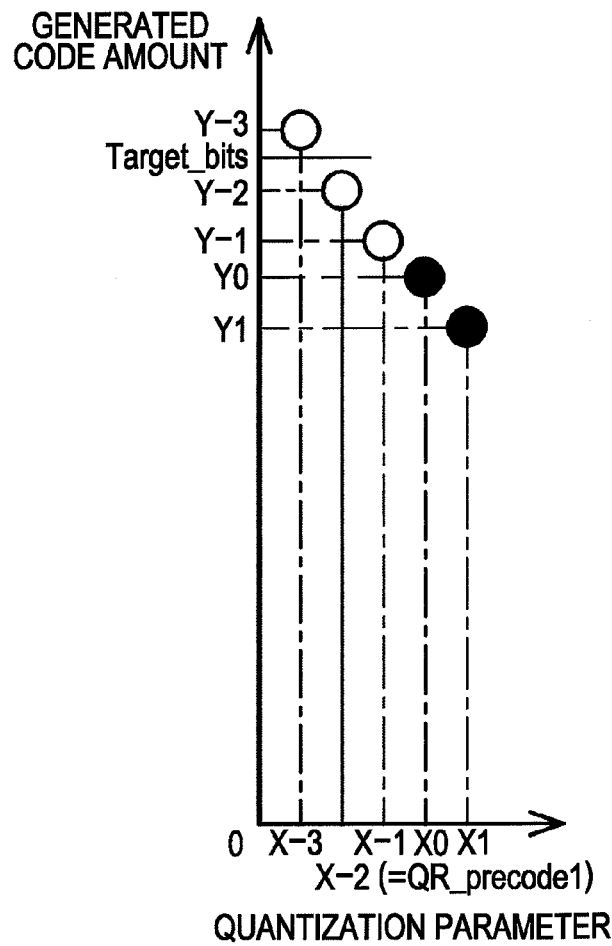
FIG. 15 is a graph illustrating another interpolation method using an increasing rate.

FIG. 15 is a graph illustrating another interpolation method using an increasing rate. This interpolation process is used when the target code amount is larger than the code amount calculated by the first pre-encoding unit 20 and the difference between quantization parameters QP used as reference points of the interpolation process is 1. Further, for example, a code amount when a quantization parameter QP is "X0" is defined as "Y0" and a code amount when the quantization parameter QP is "X1" is defined as "Y1". The code amount control unit 40 calculates variation RT from the code amounts calculated by the first pre-encoding unit 20 based on Equation 7 below.

$$RT=(Y0-Y1)/Y1 \quad \text{Equation 7}$$

The code amount control unit 40 calculates a generated code amount of a quantization parameter QP based on Equation 8 below, which is smaller than a previously calculated generated code amount of a quantization parameter QP by "1", from the previously calculated generated code amount and the variation RT obtained through Equation 7. In Equation 8, a generated code amount when the quantization parameter QP corresponding to the previously calculated generated code amount is "Xq" is defined as "Yq", and a generated code amount when the quantization parameter QP smaller than "Xq" by "1" is "Xq−1" is defined as "Yq−1".

$$Yq-1=Yq\times(1+RT) \quad \text{Equation 8}$$

In this way, the code amount control unit 40 sequentially performs the calculation of generated code amounts based on Equation 8, which correspond to quantization parameters QP having values smaller than that of quantization parameters QP used for calculating generated code amounts. For example, a generated code amount "Y−1" when a quantization parameter QP is "X−1" smaller than "X0" by "1" is equal to (Y0×Y0/Y1) from Equation 8. Further, a generated code amount "Y−2" when a quantization parameter QP is "X−2" smaller than "X0" by "2" is equal to (Y−1×Y0/Y1) from Equation 8.

Thereafter, when the calculated generated code amount exceeds the target code amount, a value larger than the quantization parameter QP at this time by "1" is employed as the temporary quantization parameter QP_precode1. For example, in FIG. 15, when a quantization parameter QP is "X−3", since the calculated generated code amount exceeds the target Code amount, a value "X−2" larger than the quantization parameter QP at this time by "1" is decided as the temporary quantization parameter QP_precode1.

Next, the case in which an interval of quantization parameters used for calculating the variation is larger than "1" will be described. In such a case, the code amount control unit 40 uses generated code amounts obtained by performing interpolation in an interval of the quantization parameters used for calculating the variation, and calculates generated code amounts of quantization parameters located in the interval of the quantization parameters used for calculating the variation.

Figure 16:
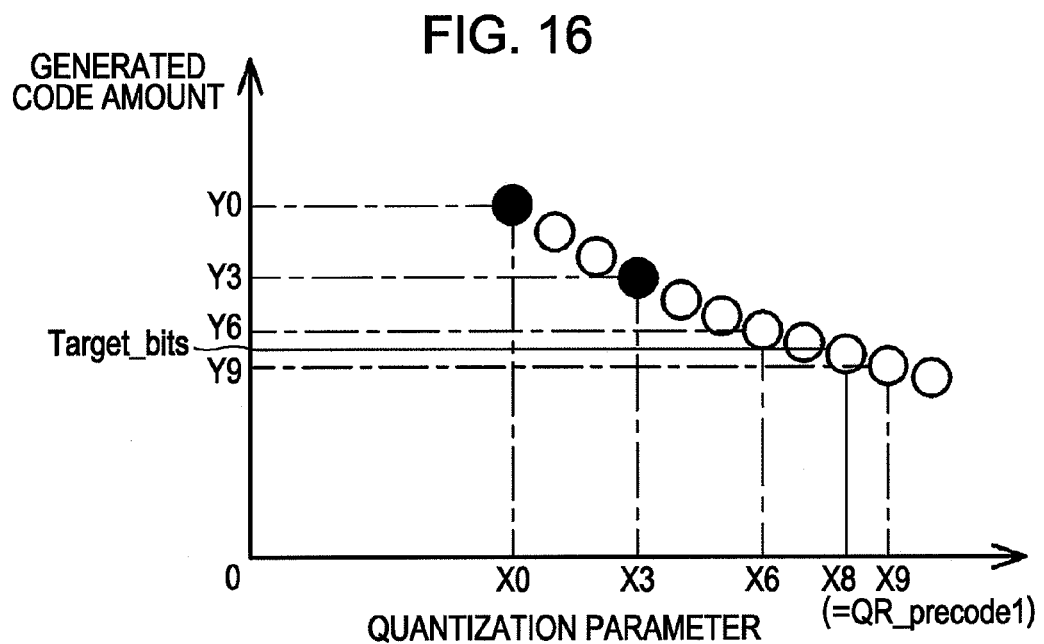
FIG. 16 is a graph illustrating an interpolation method using an increasing rate when the difference between quantization parameters is other than 1.

FIG. 16 is a graph illustrating an interpolation method using an increasing rate when the difference between quantization parameters is other than 1. Further, FIG. 16 illustrates in the case in which the target code amount is smaller than the generated code amount calculated by the first pre-encoding unit 20 and the difference between quantization parameters used as reference points of the interpolation process is, for example, "3".

Herein, a generated code amount when a quantization parameter QP is "X0" is defined as "Y0" and a generated code amount when the quantization parameter QP is "X3" is defined as "Y3". The code amount control unit 40 calculates variation RT from the code amounts calculated by the first pre-encoding unit 20 based on Equation 9 below.

$$RT=(Y3-Y0)/Y0 \quad \text{Equation 9}$$

The code amount control unit 40 calculates a generated code amount of a quantization parameter QP based on Equation 10 below, which is larger than a previously calculated generated code amount of a quantization parameter QP by "3", from the previously calculated generated code amount and the variation RT obtained through Equation 9. In Equation 10, a generated code amount when the quantization parameter QP corresponding to the previously calculated generated code amount is "Xp" is defined as "Yp", and a generated code amount when the quantization parameter QP larger than "Xp" by "3" is "Xp+3" is defined as "Yp+3".

$$Yp+3=Yp\times(1+RT) \qquad \text{Equation 10}$$

In this way, the code amount control unit 40 sequentially performs the calculation of code amounts, which correspond to quantization parameters QP having values larger than that of quantization parameters QP used for calculating generated code amounts, in an interval of the quantization parameters used for calculating the variation based on Equation 10. For example, a generated code amount "Y6" when a quantization parameter QP is "X6" larger than "X3" by "3" is equal to (Y3×Y3/Y0) from Equation 10. Further, a generated code amount "Y9" when a quantization parameter QP is "X9" larger than "X3" by "6" is equal to (Y6×Y3/Y0) from Equation 10.

Thereafter, in the case in which the calculated generated code amount is equal to or less than the target code amount, the code amount control unit 40 performs the linear interpolation using the generated code amount when a quantization parameter QP is "Xr−3" prior to "Xr" by "3".

Through this linear interpolation, generated code amounts "Yr−1" and "Yr−2" when quantization parameters QP located in the interval of the quantization parameters used for calculating the variation are "Xr−1" and "Xr−2" are calculated by Equations 11 and 12 below.

$$Yr-1=(Yr-Yr-3)/(Xr-Xr-3)\times(Xr-1-Xr-3)+Yr-3 \qquad \text{Equation 11}$$

$$Yr-2=(Yr-Yr-3)/(Xr-Xr-3)\times(Xr-2-Xr-3)+Yr-3 \qquad \text{Equation 12}$$

The code amount control unit 40 determines a generated code amount, which is smaller than the target code amount and is located in the nearest position to the target code amount, among the calculated generated code amounts "Yr−3" to "Yr", and decides a quantization parameter QP corresponding to the determined generated code amount as the temporary quantization parameter QP_precode1. For example, referring to FIG. 16, since a generated code amount "Yr−3" corresponds to "Y6" and a generated code amount "Yr" corresponds to "Y9", the code amount control unit 40 decides "X8" as the temporary quantization parameter QP_precode1.

Figure 17:
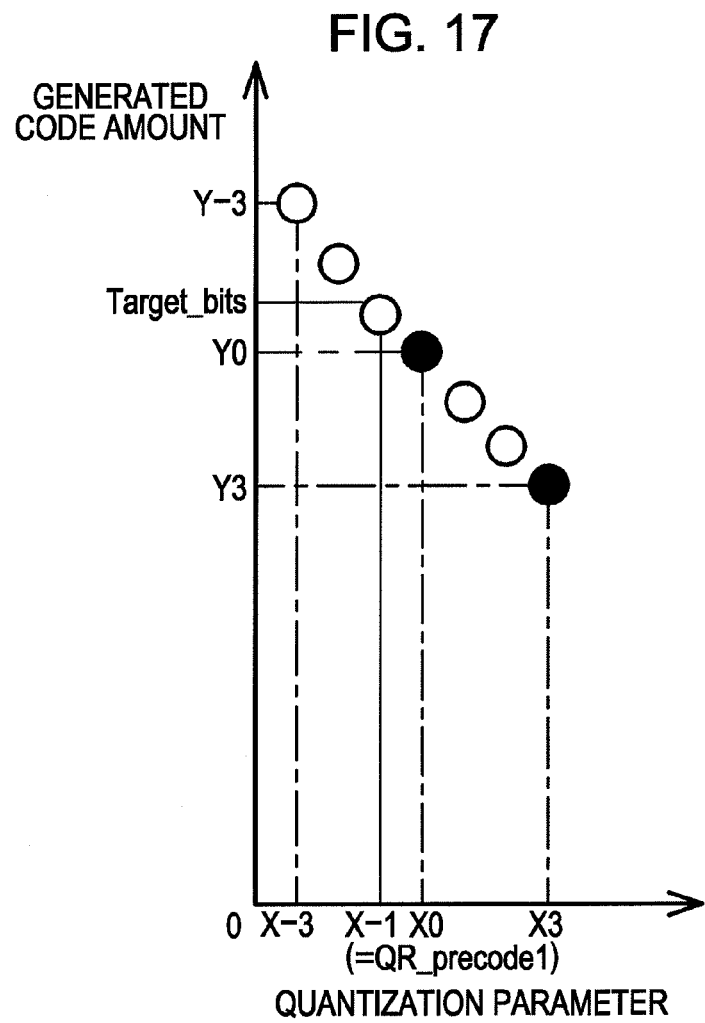
FIG. 17 is a graph illustrating another interpolation method using an increasing rate when the difference between quantization parameters is other than 1.

FIG. 17 is a graph illustrating another interpolation method using an increasing rate when the difference between quantization parameters is other than 1. Further, FIG. 17 illustrates the case in which the target code amount is larger than the generated code amount calculated by the first pre-encoding unit 20 and the difference between quantization parameters used as reference points of the interpolation process is, for example, "3".

Herein, a generated code amount when a quantization parameter QP is "X0" is defined as "Y0" and a generated code amount when the quantization parameter QP is "X3" is defined as "Y3". The code amount control unit 40 calculates variation RT from the code amounts calculated by the first pre-encoding unit 20 based on Equation 13 below.

$$RT=(Y0-Y3)/Y3 \qquad \text{Equation 13}$$

The code amount control unit 40 calculates a generated code amount of a quantization parameter QP based on Equation 14 below, which is smaller than a previously calculated generated code amount of a quantization parameter QP by "3", from the previously calculated generated code amount and the variation RT obtained through Equation 13. In Equation 14, a generated code amount when the quantization parameter QP corresponding to the previously calculated generated code amount is "Xq" is defined as "Yq", and a generated code amount when the quantization parameter QP smaller than "Xq" by "3" is "Xq−3" is defined as "Yq−3".

$$Yq-3=Yq\times(1+RT) \qquad \text{Equation 14}$$

In this way, the code amount control unit 40 sequentially performs the calculation of code amounts, which correspond to quantization parameters QP having values smaller than that of quantization parameters QP used for calculating generated code amounts, in an interval of the quantization parameters used for calculating the variation based on Equation 14. For example, a generated code amount "Y−3" when a quantization parameter QP is "X−3" smaller than "X0" by "3" is equal to (Y0×Y0/Y3) from Equation 14. Further, a generated code amount "Y−6" when a quantization parameter QP is "X−6" smaller than "X0" by "6" is equal to (Y−3×Y0/Y3) from Equation 14.

Thereafter, in the case in which the calculated generated code amount exceeds the target code amount, the code amount control unit 40 performs the linear interpolation using the generated code amount when a quantization parameter QP is "Xs+3" next to "Xs" by "3". Through this linear interpolation, generated code amounts "Ys+1" and "Ys+2" when quantization parameters QP located in the interval of the quantization parameters used for calculating the variation are "Xs+1" and "Xs+2" are calculated by Equations 15 and 16 below.

$$Ys+1=(Ys+3-Ys)/(Xs+3-Xs)\times(Xs+1-Xs)+Ys \qquad \text{Equation 15}$$

$$Ys+2=(Ys+3-Ys)/(Xs+3-Xs)\times(Xs+2-Xs)+Ys \qquad \text{Equation 16}$$

The code amount control unit 40 determines a generated code amount, which is smaller than the target code amount and is located in the nearest position to the target code amount, among the calculated generated code amounts "Ys" to "Ys+3". In addition, the code amount control unit 40 decides a quantization parameter QP corresponding to the determined generated code amount as the temporary quantization parameter QP_precode1. For example, referring to FIG. 17, since a generated code amount "Ys" corresponds to "Y−3" and a generated code amount "Ys+3" corresponds to "Y0", the code amount control unit 40 decides "X−1" as the temporary quantization parameter QP_precode1.

Further, when a quantization parameter QP has a low value, the interval of the quantization step is decreased. However, when a quantization parameter QP has a large value, the interval of the quantization step is increased. In addition, if a transmission rate is increased for reduction of image degradation and thus the target code amount is increased, the value of a quantization parameter QP becomes small in coding for a desired target code amount. Thus, the first pre-encoding unit 20 allows the target code amount to be included in the range of quantization parameters for selecting the minimum value of the quantization parameter QP. For example, the first pre-encoding unit 20 selects quantization parameters as indicated by the black circles of FIG. 5. In this way, the interpolation using the variation is performed only when the value of the quantization parameter QP is large, and the interpolation using the quadratic curve is performed in other cases. Consequently, as compared with existing linear interpolation, it is possible to decide the temporary quantization parameter QP_precode1 with high accuracy.

<8. Optimal Quantization Parameter Decision Process>

The code amount control unit 40 compares the target code amount with the generated code amounts obtained through the pre-encoding performed by the first pre-encoding unit 20, thereby deciding the optimal quantization parameter QP_precode2 corresponding to the target code amount.

Herein, a generated code amount of the temporary quantization parameter QP_precode1 is defined as "Generated_bits(QP_precode1)", a generated code amount of the QP_precode1−1 is defined as "Generated_bits(QP_precode1−1)", and a generated code amount of the QP_precode1+1 is defined as "Generated_bits(QP_precode1+1)". Further, the target code amount is defined as "Target_bits".

In the case of Generated_bits(QP_precode1+1)<=Target_bits<=Generated_bits(QP_precode1−1), a quantization parameter QP, which corresponds to a generated code amount smaller than the target code amount and located in the nearest position to the target code amount, is employed as the optimal quantization parameter QP_precode2.

Otherwise, as described below, the code amount control unit 40 obtains variation of a generated code amount with respect to variation of quantization parameters QP from the results of the second pre-encoding. Herein, when the values of the quantization parameters QP are close to each other, since it is assumed that the variation becomes nearly constant, generated code amounts of each quantization parameter QP are predicted, and a quantization parameter QP, which corresponds to a generated code amount smaller than the target code amount and located in the nearest position to the target code amount, is employed as the optimal quantization parameter QP_precode2.

First, whenever the quantization parameter QP is changed by "1", the code amount control unit 40 calculates the variation of the generated code amount from the results of the second pre-encoding based on Equations 17 to 19.

$$\text{DiffRatio\_1}=(\text{Generated\_bits}(QP\_precode1-1)-\text{Generated\_bits}(QP\_precode1))/\text{Generated\_bits}(QP\_precode1) \quad \text{Equation 17}$$

$$\text{DiffRatio\_2}=(\text{Generated\_bits}(QP\_precode1)-\text{Generated\_bits}(QP\_precode1+1))/\text{generated\_bits}(QP\_precode1+1) \quad \text{Equation 18}$$

$$\text{DiffRatio}=(\text{DiffRatio\_1}+\text{DiffRatio\_2})/2 \quad \text{Equation 19}$$

Next, the code amount control unit 40 calculates generated code amounts by using the variation DiffRatio of generated code amounts. Herein, if DeltaQp is defined as an absolute value of the difference between a calculated quantization parameter QP and the temporary quantization parameter QP_precode1, when the quantization parameter QP is smaller than the temporary quantization parameter QP_precode1, generated code amounts are calculated from Equation 20 below.

$$\text{Generated\_bits}(QP)=\text{generated\_bits}(QP\_precode1-1)\times(1.0+\text{DiffRatio})^{\wedge}(\text{DeltaQp}-1) \quad \text{Equation 20}$$

When the quantization parameter QP is larger than the temporary quantization parameter QP_precode1, generated code amounts are calculated from Equation 21 below.

$$\text{Generated\_bits}(QP)=\text{generated\_bits}(QP\_precode1+1)\times(1.0-\text{DiffRatio})^{\wedge}(\text{DeltaQp}-1) \quad \text{Equation 21}$$

In this way, the code amount control unit 40 decides a quantization parameter QP, which is located in the nearest position to the target code amount, as the optimal quantization parameter QP_precode2 used for the main encoding.

As described above, according to the invention, only the quantization sections and the code length calculating sections in the first and second pre-encoding units have a parallel configuration, and other processing elements are commonly used, so that the circuit size can be reduced. Further, in the first pre-encoding, the parallel pre-encoding suppressing the circuit size and the processing load is performed with low accuracy by using quantization parameters QP of a wide range, and the base quantization parameters for realizing the target code amount are roughly predicted. In the second pre-encoding, the parallel pre-encoding performed with high accuracy in a narrow range and the base quantization parameters used for the main encoding are decided. In this way, the accuracy of image coding can be improved and the processing load can be reduced.

In addition, in the process of roughly predicting the base quantization parameters, the generated code amounts corresponding to the sorted quantization parameters are calculated from the generated code amounts, which correspond to the quantization parameters selected in the first pre-encoding, through the interpolation process. Further, the interpolation method used for the interpolation process is changed according to the positions of the quantization parameters used for calculating the generated code amounts. Thus, the accuracy of the interpolation process can be improved as compared with the case of performing the interpolation process by using one interpolation method. That is, the accuracy of the temporary quantization parameter QP_precode1, which corresponds to the roughly predicted base quantization parameter, is improved, so that the base quantization parameter used for the main encoding can be employed as the optimal quantization parameter.

Consequently, the generated code amount can be made to correspond to the target code amount given to one picture without performing in-screen feedback control. Therefore, it is possible to prevent the occurrence of problems such as adverse effects due to an inappropriate initial value of a feedback parameter or inappropriate target code amount distribution. As a result, the generated code amount can be made to coincide with the target code amount, and code amount distribution can be performed by taking visual characteristics into consideration, that is, decision of a quantization parameter is possible.

Further, the image coding apparatus and the image coding method according to the invention can be realized by a computer apparatus. In such a case, a computer program, which allows the computer apparatus to serve as the image coding apparatus, for example, can be provided in a computer-recognizable format with respect to a general-purpose computer system capable of executing various types of programs and coding. For example, the computer program can be provided as a computer program stored in a storage medium such as an optical disc, a magnetic disc or a semiconductor memory, or an information medium such as a network. As described above, the computer program is provided in the computer-recognizable format, so processes corresponding to the computer program are performed by the computer apparatus. Consequently, the operation of the image coding apparatus and the image coding method as described above can be realized.

The present application contains subject matter related to that disclosed in Japanese Priority Patent Application JP 2009-099901 filed in the Japan Patent Office on Apr. 16, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image coding apparatus comprising:
a first coding unit that discretely selects quantization parameters of a first range to perform calculation of generated code amounts corresponding to the selected quantization parameters;
a second coding unit that performs calculation of generated code amounts corresponding to quantization parameters of a second range which is narrower than the first range and is based on a temporary quantization parameter; and
a code amount control unit that (a) decides the temporary quantization parameter corresponding to a target code amount by (1) calculating generated code amounts, corresponding to quantization parameters not selected by the first coding unit, through an interpolation process, and (2) comparing the generated code amounts corresponding to the selected quantization parameters and the generated code amounts calculated through the interpolation process with the target code amount, and (b) decides an optimal quantization parameter corresponding to the target code amount by comparing the generated code amounts calculated by the second coding unit with the target code amount,
wherein the code amount control unit determines an interpolation method for each calculated generated code amount according to values of quantization parameters used for calculating the generated code amounts by the interpolation process, the interpolation methods include (a) a quadratic curve for quantization parameters, (b) a quadratic curve for average quantization parameters and (c) using variations in the generated code amounts according to the values of quantization parameters.

2. The image coding apparatus according to claim 1, further comprising a third coding unit that codes an image by using the decided optimal quantization parameter.

3. The image coding apparatus according to claim 1, wherein the code amount control unit determines the quantization parameters used for calculating the generated code amounts through the interpolation process by comparing the generated code amounts corresponding to the selected quantization parameters with the target code amount.

4. The image coding apparatus according to claim 3, wherein the code amount control unit changes the interpolation method according to whether the quantization parameters used for calculating the generated code amounts through the interpolation process have values in an area between the quantization parameters selected by the first coding unit.

5. The image coding apparatus according to claim 4, wherein the code amount control unit performs interpolation using the quadratic curve when the quantization parameters used for calculating the generated code amounts through the interpolation process have the values in the area between the quantization parameters selected by the first coding unit.

6. The image coding apparatus according to claim 5, further comprising an activity calculating section that calculates activity for each block in the image,
wherein, when performing calculation of generated code amounts by adding an offset corresponding to the activity to the quantization parameters, in a case in which the temporary quantization parameter corresponding to the target code amount exist in an area of quantization parameters, which are limited to a preset range when the offset has been added thereto, the code amount control unit converts the quantization parameters into the average quantization parameters to calculate generated code amounts corresponding to the average quantization parameters.

7. The image coding apparatus according to claim 4, wherein the code amount control unit performs interpolation using the variation of the generated code amounts calculated by the first coding unit when the quantization parameters used for calculating the generated code amounts through the interpolation process do not have the values in the area between the quantization parameters selected by the first coding unit.

8. The image coding apparatus according to claim 7, wherein, in the interpolation using the variation of the generated code amounts, the variation is calculated from the generated code amounts of the selected quantization parameters, and the interpolation is performed using the calculated variation in an interval of the quantization parameters used for calculating the variation.

9. The image coding apparatus according to claim 8, wherein, in the interpolation process using the variation of the generated code amounts, when the interval of the quantization parameters used for calculating the variation is greater than 1, generated code amounts of quantization parameters located in an area of the quantization parameters used for calculating the variation are obtained through linear interpolation based on the generated code amounts obtained through the interpolation process in an area of the quantization parameters used for calculating the variation.

10. An image coding method comprising the steps of:
discretely selecting, by a first coding unit, quantization parameters of a first range to perform calculation of generated code amounts corresponding to the selected quantization parameters;
calculating, by a code amount control unit, generated code amounts through an interpolation process for quantization parameters not selected by the first coding unit, and deciding a temporary quantization parameter corresponding to a target code amount by comparing the generated code amounts corresponding to the selected quantization parameters and the generated code amounts calculated through the interpolation process with the target code amount;
performing, by a second coding unit, calculation of generated code amounts corresponding to quantization parameters of a second range which is narrower than the first range and is based on the temporary quantization parameter; and
deciding, by the code amount control unit, an optimal quantization parameter corresponding to the target code amount by comparing the generated code amounts calculated by the second coding unit with the target code amount,
wherein, in the interpolation process performed by the code amount control unit, an interpolation method is determined for each calculated generated code amount according to values of quantization parameters used for calculating generated code amounts by the interpolation process, the interpolation methods include (a) a quadratic curve for quantization parameters, (b) a quadratic curve for average quantization parameters and (c) using variations in the generated code amounts according to the values of quantization parameters.

* * * * *